US012728589B2

(12) United States Patent
Sadati et al.

(10) Patent No.: US 12,728,589 B2
(45) Date of Patent: Sep. 8, 2026

(54) METHODS FOR FORMING AUXETIC, ZERO, AND NEAR-ZERO POISSON'S RATIO MATERIALS AND MATERIALS FORMED THEREBY

(71) Applicant: UNIVERSITY OF SOUTH CAROLINA, Columbia, SC (US)

(72) Inventors: Monirosadat Sadati, Elgin, SC (US); Sepideh Norouzi, Columbia, SC (US); Nader Taheri-Qazvini, Elgin, SC (US); Jose Adrian Martinez Gonzalez, San Luis Potosi (MX)

(73) Assignee: University of South Carolina, Columbia, SC (US)

( * ) Notice: Subject to any disclaimer, the term of this patent is extended or adjusted under 35 U.S.C. 154(b) by 515 days.

(21) Appl. No.: 18/187,828

(22) Filed: Mar. 22, 2023

(65) Prior Publication Data

US 2023/0302722 A1 Sep. 28, 2023

Related U.S. Application Data

(60) Provisional application No. 63/322,837, filed on Mar. 23, 2022.

(51) Int. Cl.

| | |
|---|---|
| ***B29C 64/124*** | (2017.01) |
| ***B29K 21/00*** | (2006.01) |
| ***B29L 31/60*** | (2006.01) |
| ***B33Y 10/00*** | (2015.01) |
| ***B33Y 80/00*** | (2015.01) |
| ***C09K 19/02*** | (2006.01) |

(52) U.S. Cl.

CPC ........ *B29C 64/124* (2017.08); *C09K 19/0275* (2013.01); *B29K 2021/003* (2013.01); *B29L 2031/608* (2013.01); *B33Y 10/00* (2014.12); *B33Y 80/00* (2014.12)

(58) Field of Classification Search

CPC . B29C 64/124; B29C 64/106; C09K 19/0275; C09K 19/586; B29K 2021/003; B29L 2031/608; B33Y 10/00; B33Y 80/00

See application file for complete search history.

(56) References Cited

U.S. PATENT DOCUMENTS

| | | | | |
|---|---|---|---|---|
| 8,580,144 B2 | 11/2013 | Chien et al. | | |
| 2019/0049767 A1* | 2/2019 | de Pablo | G02F 1/137 |
| 2021/0062970 A1* | 3/2021 | Pham | B33Y 50/02 |
| 2023/0203951 A1* | 6/2023 | Kibsey | B33Y 80/00 416/241 R |

OTHER PUBLICATIONS

Henrich et al., Structure of Blue Phase III of Cholesteric Liquid Crystals, PRL 106, 107801 (Year: 2011).*

* cited by examiner

*Primary Examiner* — Nathan L Van Sell
(74) *Attorney, Agent, or Firm* — Dority & Manning, P.A.

(57) ABSTRACT

Synthetic two- or three-dimensional structures are described that include directional negative, near-zero, or zero Poisson ratio. Methods for forming the structures are also described. Disclosed structures mimic disclination networks as occur in soft cubic blue phase high chirality liquid crystals. Disclination networks can be based upon BPI or BPII phases and can include modifications as compared to an undistorted bulk blue phase crystal.

13 Claims, 28 Drawing Sheets

METHODS FOR FORMING AUXETIC, ZERO, AND NEAR-ZERO POISSON'S RATIO MATERIALS AND MATERIALS FORMED THEREBY

CROSS REFERENCE TO RELATED APPLICATION

This application claims filing benefit of U.S. Provisional Patent Application Ser. No. 63/322,837 having a filing date of Mar. 23, 2022, which is incorporated herein by reference for all purposes.

BACKGROUND

The Poisson's ratio of a material is defined as the negative ratio of lateral strain to longitudinal strain. The lateral strain is generally determined by the deformation in directions perpendicular to the load. Materials with a negative Poisson's ratio are known as auxetic structures. Upon subject to a positive strain in a longitudinal axis, these materials will exhibit a positive transverse strain, i.e., they will increase in size in the direction transverse to the axis of strain. For zero or near-zero Poisson's ratio materials (commonly referred to as ZPR and NPR materials, respectively), such as cork and certain open-celled polymer foams, the materials will exhibit little or no transverse deformation with an axial strain.

Auxetic responses are ubiquitous in nature, spanning from animals' skins such as those of cats and snakes to the dimensional stability of aquatic organisms under hydrostatic pressure. ZPR and NPR materials are limited in nature to fewer examples such as cork and cancellous bone structures. The orientation-dependent auxetic response has also been demonstrated in many rigid cubic crystals such as face-centered cubic, body-centered cubic, and simple cubic rigid lattice symmetries.

Few synthetic materials with auxetic, ZPR, or NPR mechanical responses have been reported. In the case of auxetic rigid crystal structures, these adhere to the category of re-entrant, chiral, and rotating unit structures. A few synthetic rigid crystal structures with NPR responses have been described that are mostly categorized as re-entrant, chiral, and rotating units, but synthetic rigid crystal structures with ZPR responses are quite limited.

Needed in the art are methods for developing and forming large scale auxetic, ZPR, and NPR materials with controllable and tailorable properties.

SUMMARY

According to one embodiment, disclosed is a method for forming an auxetic, ZPR, or NPR material. A method can include mapping the disclination lines (also referred to herein as defect lines, a disclination pattern, or a disclination network) of blue phase (BP) liquid crystals. Following, a method can include scaling up the mapped network (e.g., from a nanometer to a micrometer scale or larger), and manufacturing a structure that incorporates the scaled-up mapped network in a positive (i.e., presence of formation material) or negative (i.e., lack of formation material) fashion. For instance, the manufacturing can be carried out according to an additive manufacturing process, e.g., 3D printing, stereolithography, or the like. In some embodiments, a method can also include forming the BP crystals upon which the macroscopic structure is based. A BP formation process can include tailoring the disclination network and crystal structures through modification of temperature, designation of a property of the crystal (e.g., surface anchoring, surface curvature, size of the confined space), employing external stimuli such as electric and magnetic fields, etc.

Also disclosed are auxetic, ZPR, and NPR structures that can be formed according to disclosed methods. A structure can include a two- or three-dimensional network that includes a plurality of connected nodes as either a positive or negative network (i.e., presence or absence of a formation material), with separations between individual nodes of the network on a scale that is larger than that of BP crystals disclination patterns on which the network is based. The network can mimic that of the disclination pattern of a BP crystal, e.g., a body-centered cubic lattice symmetry, a simple cubic lattice symmetry, or a variation thereon caused by modification of the basic lattice symmetry of the BP crystal, e.g., anchoring and/or curvature of one or more surfaces of the BP crystal.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
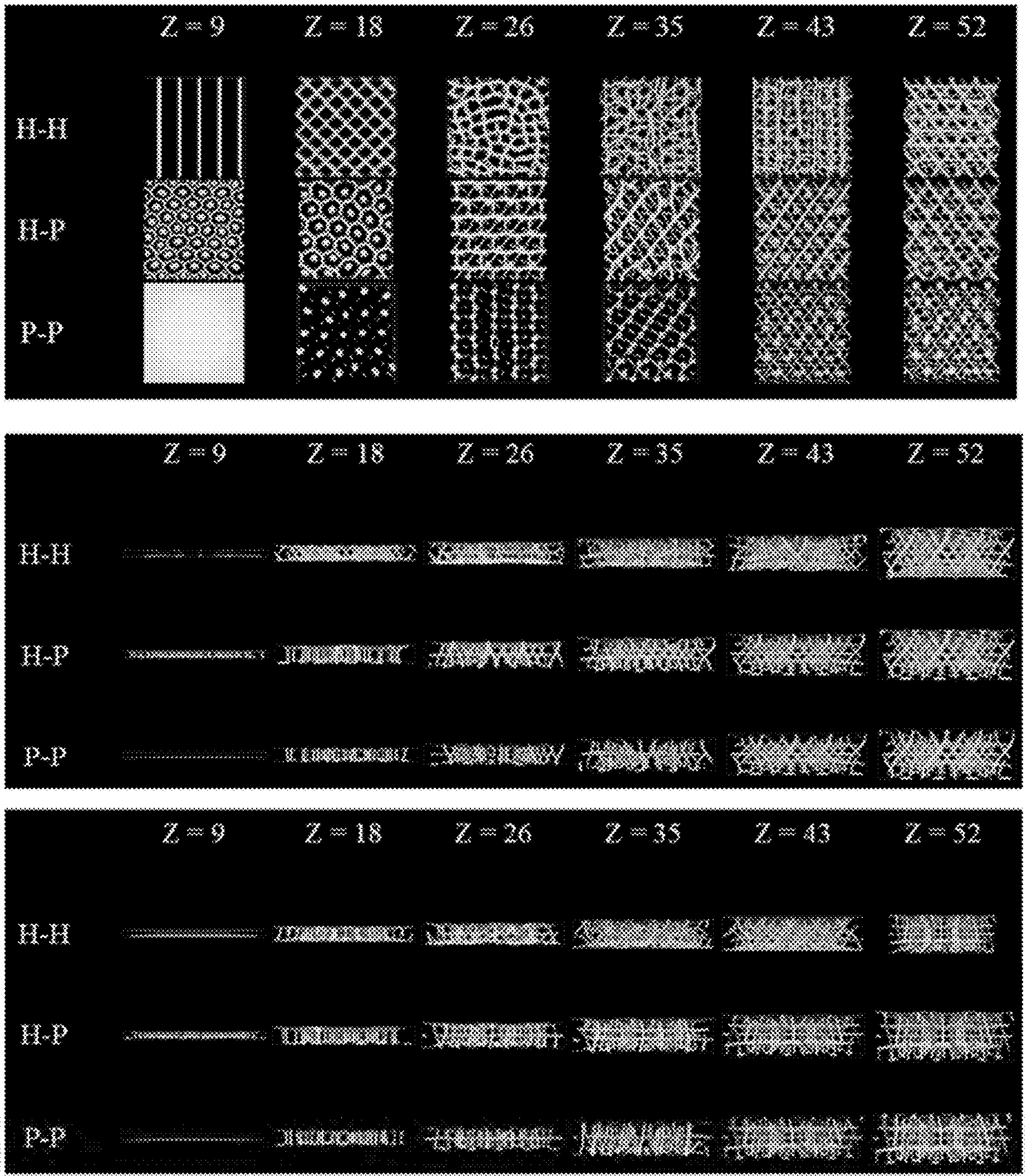
FIG. 1 illustrates the disclination line structures at the BPI temperature regimen for several BP crystals formed in flat films.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed herein are synthetic three-dimensional macroscopic structures with directional negative, near-zero, or zero Poisson ratio and methods for forming the structures.

More specifically, disclosed synthetic structures are based upon defect networks as may occur in high chirality soft cubic BP liquid crystals.

BP crystals are a unique subset of liquid crystalline materials that create a three-dimensional ordered cubic symmetry referred to as BPI and BPII phases that are analogous of rigid atomic crystals. Free energy minimization within the liquid crystal materials at different temperature regimes gives rise to unique arrangements of defect structures (disclination patterns) in the liquid crystalline state to create these phases. Disclosed formation techniques and constructs formed thereby are based upon the discovery that disclination networks of high chirality BP liquid crystals can be utilized to provide patterns for macroscale manufactured structures that can exhibit orientation-dependent zero, near zero and/or negative Poisson's ratio over a large range of strain, independent of scale and materials of formation.

Manufactured macroscopic structures formed according to disclosed methods can include tailorable properties that can be well-suited for targeted applications and can exhibit extraordinary properties compared to isotropic or non-auxetic structures formed of similar materials. Due to their customizable designs with capability to exhibit directional anisotropy, disclosed structures can, for example, selectively reverse, suppress, or enhance mechanical stresses that are not controllable in non-auxetic structures formed of similar materials. Moreover, disclosed structures can be formed on a large scale with high surface areas and low densities and/or high porosity, e.g., for formation of large, lightweight structures that can exhibit auxetic, ZPR, or NPR characteristics.

Disclosed structures are based upon high chirality BP liquid crystals. At a sufficiently high degree of chirality, BP liquid crystal molecules organize into the so-called double-twisted cylinders (DTC), which subsequently self-assemble to form a three-dimensional cubic lattice structure within the crystal. As is known, these biaxially orientated DTCs are stabilized by line defects, the orientation of which determines the crystal packing structure of the lattice, including BPI with body-centered cubic lattice symmetry and BPII with simple cubic lattice symmetry.

BP liquid crystals upon which disclosed structures are based can include any 3D photonic liquid crystal that possesses a periodic cubic structure in the nanometer range. For instance, a BP liquid crystal upon which disclosed structures are based can be a monocrystalline or a polycrystalline material, but can generally include a single crystal periodicity in the nanometer range.

In some embodiments, a method can include initial formation of a BP liquid crystal, optionally including modifications as compared to the basic lattice symmetry, and mapping of the disclination network of the crystal prior to formation of the larger macroscopic structure. A BP liquid crystal upon which an auxetic, NPR or ZPR structure can be based can be prepared according to standard procedures. For instance, a BP crystal can be prepared by combining a nematic liquid crystal with a chiral dopant to form a mixture that has a low viscosity, high birefringence and is a dielectric anisotropy eutectic. Such mixtures are commercially available, e.g., BL006 (having a reported clearing point of 113° C., $\Delta n=0.28$ and $\Delta\varepsilon=17.3$), BL003, BL038, etc. available from Merck as well as other commercially available materials.

In one embodiment, a BP crystal can be formed by combining or blending a nematic liquid crystal (e.g., a commercially available nematic liquid crystal, such as from the EMD Group of Merck) with a chiral dopant in a suitable manner such as by heating the mixture to the clear temperature or by shaking. Typical chiral dopants can include, without limitation, one or more bi-naphthal derivatives, sorbitol derivatives, combinations thereof, etc. Chiral dopants and mixtures of chiral dopants are known to the art and are available from Merck, for example as C15, CB15, S-/R-811, S-/R-1011, and S5011. The amount of chiral dopant ranges in an amount generally from about 5 to about 90 parts per 100 parts by weight of the nematic liquid crystal, such as from about 10 to about 70 parts per 100 parts by weight of the nematic liquid crystal, such as from about 20 to about 60 parts per 100 parts by weight of the nematic liquid crystal.

By way of example, the generic chemical structure of a chiral bi-naphthal dopant compound has the following formula:

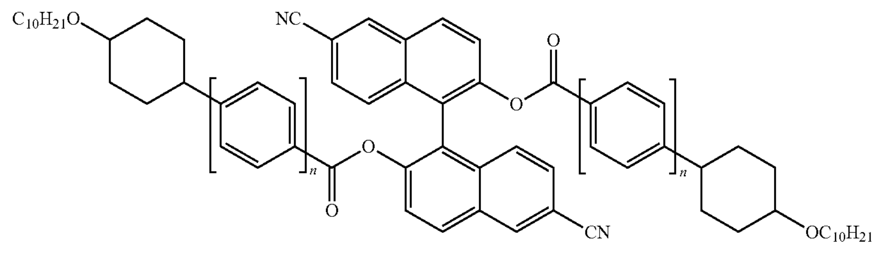

in which n=1, 2 and CN can be replaced with C1-C20, OC1-OC20, F, F—Cl—FC20, Cl, Br.

In some embodiments, a structure as described herein can mimic a known disclination pattern. For instance, a structure can mimic a known BPI disclination pattern of body-centered cubic lattice symmetry or a BPII disclination pattern of simple cubic lattice symmetry. For instance, a known BPII [100], a BPII [110], or a BPII [111] disclination pattern can be utilized as a basis for forming a macroscopic structure through scaling up of the disclination pattern.

A disclination pattern upon which an auxetic, ZPR, or NPR macroscopic structure is based can be modified as compared to the basic lattice symmetry structure of a bulk liquid crystal BPI or BPII disclination network. In these structures lattice nodes contain higher mass and the auxetic properties are induced via the bucking mechanism. In one embodiment, modification can include introduction of curvature to one or more surfaces in contact with the liquid crystal. In some embodiments, a modification can include surface anchoring at one or more surfaces of the liquid crystal, which can vary according to type of surface anchoring (e.g., planar or homeotropic surface anchoring) as well as strength of surface anchoring. Other modifications to a basic lattice symmetry structure of a BP crystal can include, without limitation, modification of the overall geometry of the space engulfing the liquid crystal and modification brought about upon application of external stimuli such as electric field, magnetic field, etc. to the liquid crystal.

Modifications via anchoring of a liquid crystal can be brought about through incorporation of surfactants in the external phase of a liquid crystal mixture. For instance, addition of a nonionic surfactant such as polyvinyl alcohol, a polysorbate, etc. to an external phase can encourage planar anchoring of a BP liquid crystal at the interface of the liquid crystal with the external phase. Planar surface anchoring of a liquid crystal can encourage the liquid crystal molecules to align at an interface between the liquid crystal and an adjacent fluid, e.g., an aqueous interface. Planar surface anchoring can align the twist axis normal to the surface, with no frustration, forming a radial spherical structure in the cholesteric phase with a cross pattern observed under a polarized microscope.

Homeotropic surface anchoring of a liquid crystal can be utilized to modify the basic crystal lattice structure and provide a modified disclination pattern for use in forming a synthetic material as described. Homeotropic surface anchoring orients liquid crystal molecules perpendicular to the interface, leading to parallel alignment of the twist axis to the interface. Homeotropic surface anchoring can be brought about in one embodiment through addition of an anionic surfactant to the external phase adjacent the liquid crystal, e.g., sodium dodecyl sulfate, sodium laurel sulfate, etc.

Of course, combinations of crystal lattice structure modification approaches can be incorporated. For instance, a liquid crystal upon which a synthetic material is based can include different types of surface anchoring in combination, e.g., homeotropic surface anchoring at a first surface and planar surface anchoring at a second surface can be utilized in developing the BP crystal disclination pattern upon which a structure is based.

Surface curvature can also be utilized as a design parameter when developing a disclination pattern upon which a structure is based, as the radius of curvature will also affect the disclination pattern of the resulting curved crystals. Spatially curved constraints introduced through formation of crystals having a bulk shape that includes curvature such as droplets, spheroids, toroids, cylinders, shells, etc. can host more intricate chiral assemblies due to the coupling of curvature and various boundary conditions.

Crystals can also be formed with a combination of variations in characteristics as compared to a flat, non-anchored, solid crystal film, e.g., surface curvature optionally combined with one or more types/strengths of surface anchoring, bulk shape of crystals (e.g., hollow vs. solid), thickness of crystals, variation in chiral pitch (i.e., the distance over which the disclination lines undergo a full 360° twist in a DTC), etc. For instance, the frustrations induced by surface curvature combined with homeotropic surface anchoring can disrupt the BP lattice periodicity, forcing it to shrink and form junctions of disclination lines near the interface, which can be reflected in a macroscopic structure based upon the disclination pattern.

In some embodiments, a liquid crystal can be formed with a predetermined ratio of thickness to chiral pitch, which can modify the disclination pattern utilized to form a macroscopic structure as described. The ratio of crystal thickness (h) to chiral pitch (p) can be, for example, about 0.5 or greater, about 1 or greater, or greater than 1 in some embodiments.

Physical confinement of a liquid crystal can be utilized to modify the disclination pattern in some embodiments. For instance, at high chirality, a distortion in the liquid crystal induced by a nanoscale gap between two flat surfaces between which the crystal is held can lead to the formation of novel arrays of disclination lines including double helix orientation, winding lines, and staggered structures of disclination lines that can be mimicked in macro-scale structures that are based upon the disclination pattern of the crystal. These variations can thus be utilized to modify mechanical characteristics of the macroscopic structures.

The distortion induced in molecular orders of a liquid crystal through temperature, physical confinement, curvature, surface anchoring, external stimuli, etc., can trigger phase behavior including formation of disclination patterns that are markedly different from that of the undistorted bulk crystal. Introduction to the disclination pattern of skyrmions, half-skyrmions, and ring-like defects as well as other modification as mentioned can be utilized to modify characteristics of a macroscale structure formed from the disclination pattern of the liquid crystal.

The bulk shape of a macroscopic structure can mimic the bulk shape of a BP crystal upon which it is based, and such bulk shape is not particularly limited. By way of example a BP crystal incorporating a disclination network of interest can have a bulk shape that is generally square, rectangular, pyramidal, etc. with the shape-defining exterior of the BP crystal including generally flat planes. Alternatively, one or more exterior surfaces of a BP crystal can include curvature. For example, a BP crystal can have a bulk shape of a cylinder, a sphere, a cone, an ovoid, a toroid, an amorphous shape, etc. Moreover, a BP crystal can define a void space, e.g., a hollow core or the like.

FIG. 1 illustrates disclination networks of several different generally planar BP crystals as may be utilized in developing a macroscopic structure. The BP crystals of FIG. 1 were formed by confinement of a liquid crystal within a flat channel at the BPI temperature regimen. The different disclination networks were formed by use of a combination of different anchoring conditions for the crystals, with H representing homeotropic anchoring and P representing planar anchoring, as well as different crystal thickness (Z). In FIG. 1, H-H, H-P and P-P refer to the anchoring conditions at the top and bottom interfaces of each crystal, respectively. The top panel shows the disclination patterns in the xy plane and the middle and bottom panels show the lateral views in the xz and yz planes, respectively.

A macroscopic structure based upon one of the BP crystals as illustrated in FIG. 1 can include a network within the structure that mimics the disclination pattern of the BP crystal. For instance, the bulk shape of the macroscopic structure can be generally rectangular, similar to that of the BP crystal itself, with a network of formation material within the interior of the rectangular structure mimicking the disclination pattern of the BP crystal.

In forming a macroscopic structure, materials of formation can mimic the disclination pattern in either a positive fashion, i.e., formation material is present as the modeled disclination lines, or in a negative fashion, i.e., formation material is present such that it surrounds the modeled disclination lines, leaving the modeled disclination lines as voids within the macroscopic structure. In one embodiment of the latter case, a macroscopic structure can include an interior porous network, e.g., an interior interconnected porous network, with the porous network mimicking the disclination lines of a BP crystal. In some embodiments, a structure can include multiple different materials of formation, for instance a first material that positively patterns the disclination lines of a BP crystal and a second material that surrounds all or a portion of the first material and thus negatively patterns the disclination lines of the BP crystal. In such an embodiment, the first material forms a pattern within the macroscopic structure, e.g., an interconnected pattern, within and surrounded by the second material. Moreover, more than one material can positively pattern the disinclination lines and/or more than one material can surround the pattern of the disinclination lines, which can be present in a macroscopic structure as a solid or a void.

Figure 2:
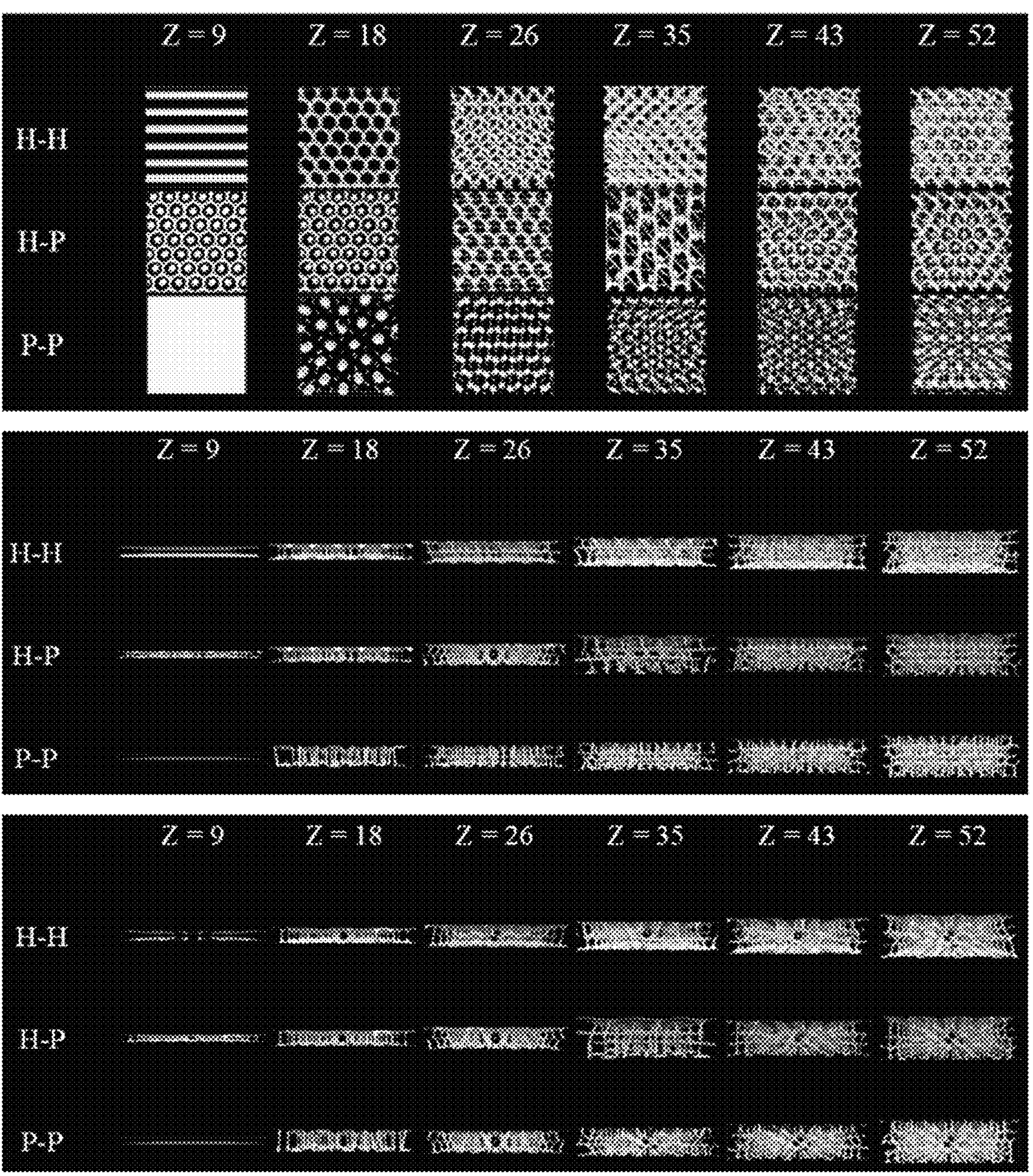
FIG. 2 illustrates the disclination line structures at the BPII temperature regimen for several BP crystals formed in flat films.

FIG. 2 illustrates additional representative disclination line structures that can be used to provide a pattern for a macroscopic structure as disclosed. The disclination patterns of FIG. 2 are those of generally planar BP crystals formed by confinement of a liquid crystal within a flat channel at the BPII temperature regimen. The different disclination networks were formed by use of a combination of different anchoring conditions for the crystals as well as different crystal thickness (Z), with H representing homeotropic anchoring and P representing planar anchoring. In FIG. 2, H-H, H-P and P-P refer to the anchoring conditions at the top and bottom interfaces of each crystal, respectively. The top panel shows the disclination patterns in the xy plane and the middle and bottom panels show the lateral views in the xz and yz planes, respectively.

Figure 3:
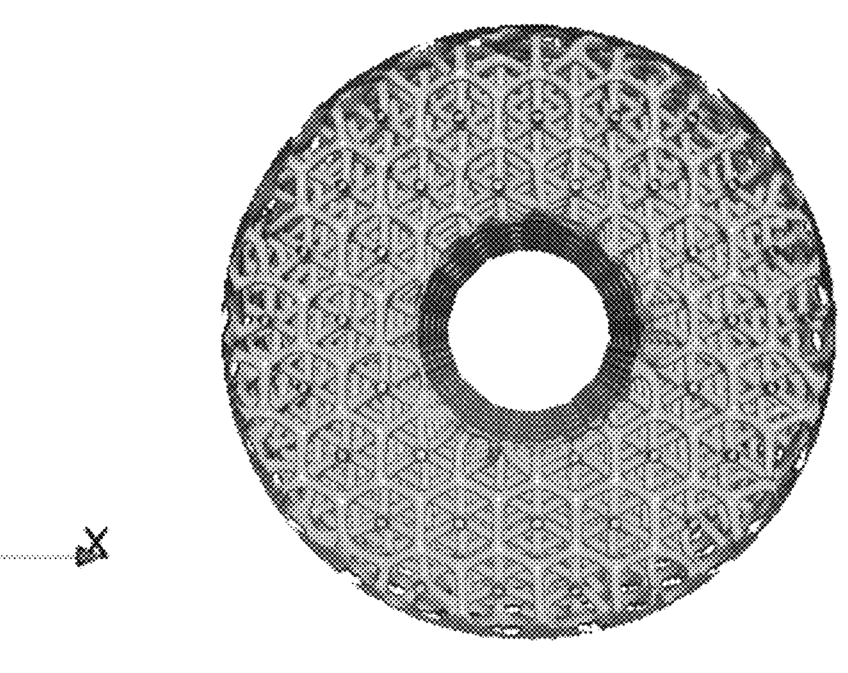
FIG. 3 illustrates a top view of a cylindrical shaped structure including a hollow axial core based upon a curved BPII phase [111] crystal including coaxial inner and outer surfaces with homeotropic anchoring at both the inner and outer axial surface.
Figure 4:
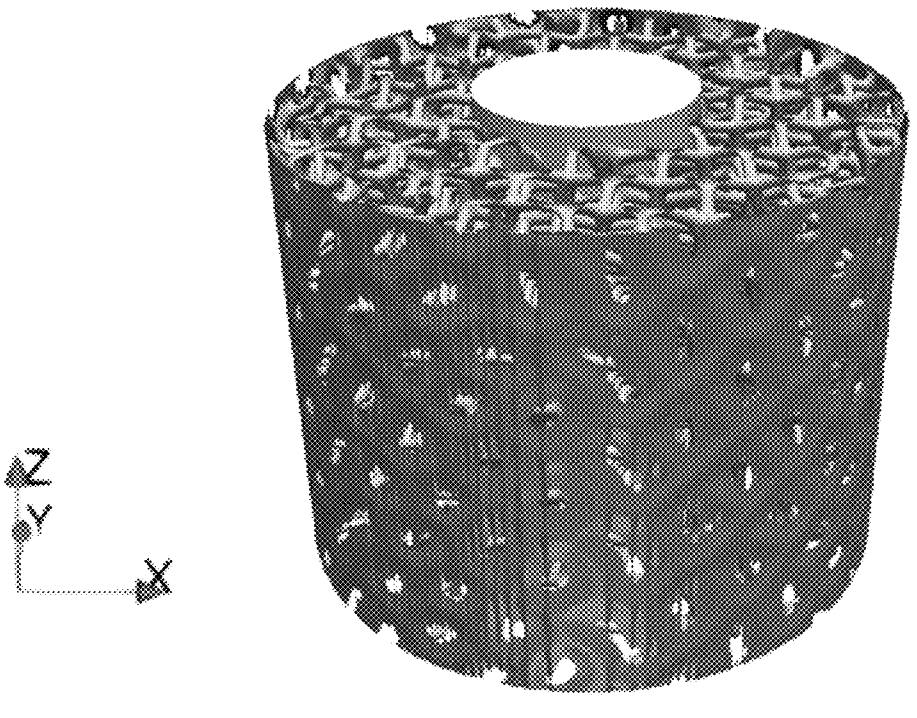
FIG. 4 illustrates a perspective view of the structure of FIG. 3.
Figure 5:
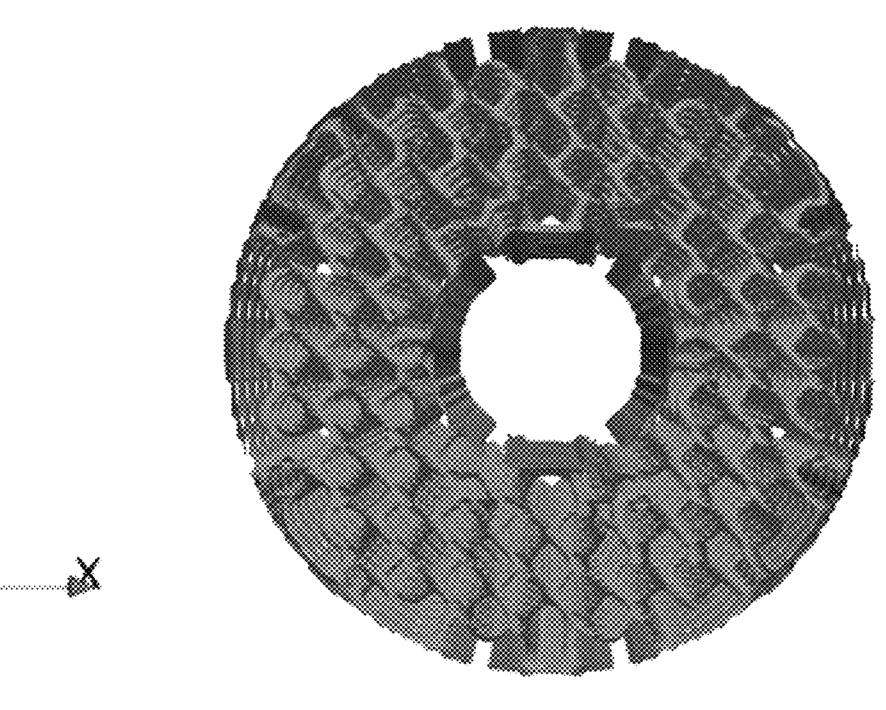
FIG. 5 illustrates a top view of a cylindrical shaped structure including a hollow axial core based upon a curved BPII phase [100] crystal including coaxial inner and outer surfaces with homeotropic anchoring at both the inner and outer axial surface.
Figure 6:
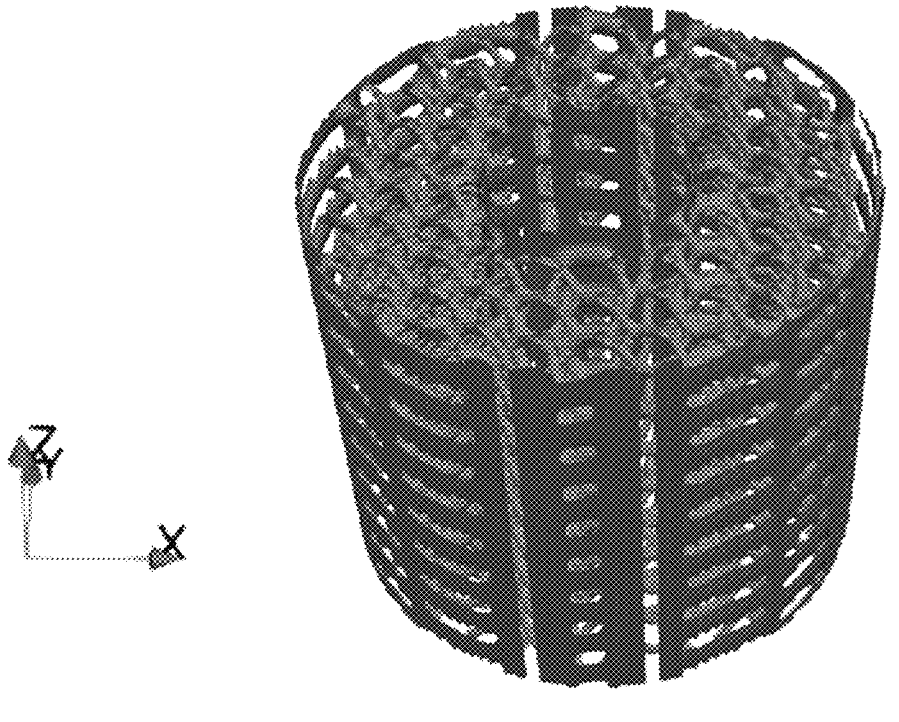
FIG. 6 illustrates a perspective view of the structure of FIG. 5.
Figure 7:
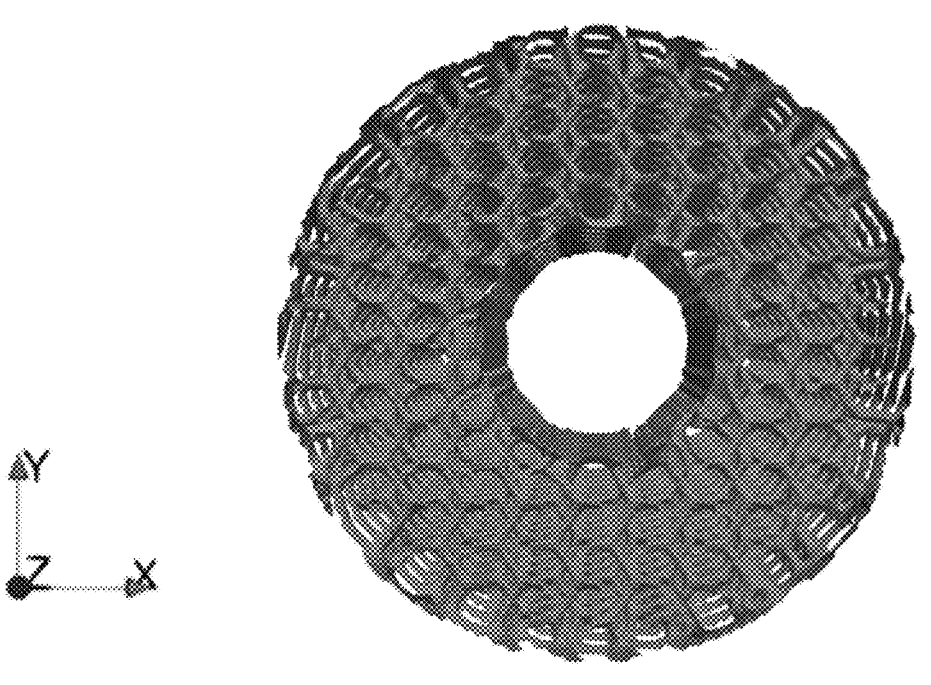
FIG. 7 illustrates a top view of a cylindrical shaped structure including a hollow axial core based upon a curved BPII phase [110] crystal including coaxial inner and outer surfaces with homeotropic anchoring at both the inner and outer axial surface.
Figure 8:
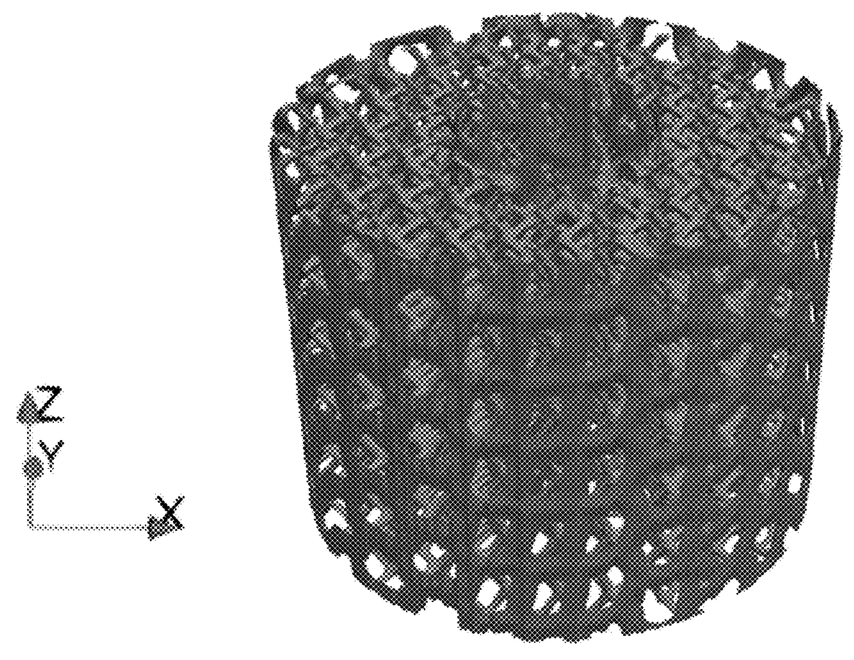
FIG. 8 illustrates a perspective view of the structure of FIG. 7.
Figure 9:
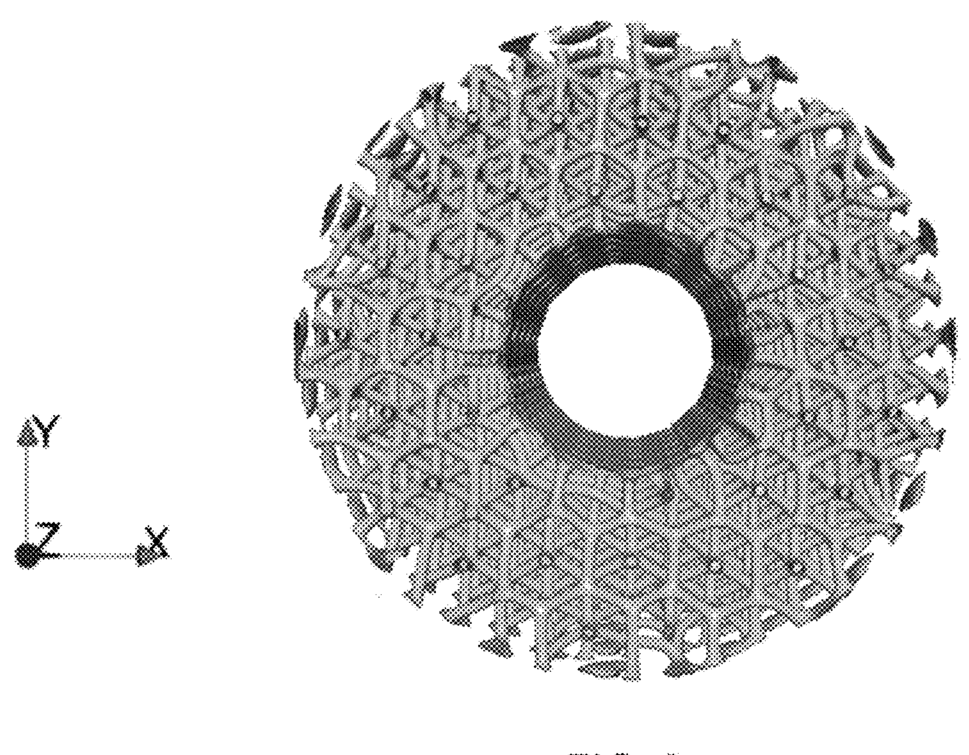
FIG. 9 illustrates a top view of a cylindrical shaped structure including a hollow axial core based upon a BPII phase [111] crystal including coaxial inner and outer surfaces with homeotropic anchoring at the inner surface and planar anchoring at the outer surface.
Figure 10:
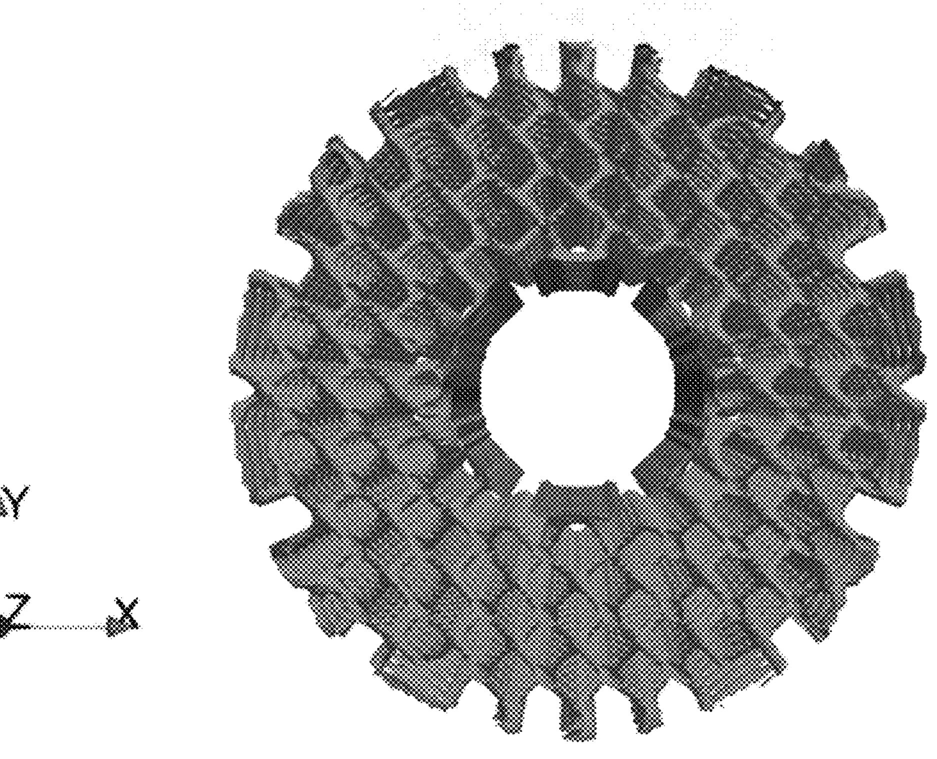
FIG. 10 illustrates a top view of a cylindrical shaped structure including a hollow axial core based upon a BPII phase [100] crystal including coaxial inner and outer surfaces with homeotropic anchoring at the inner surface and planar anchoring at the outer surface.
Figure 11:
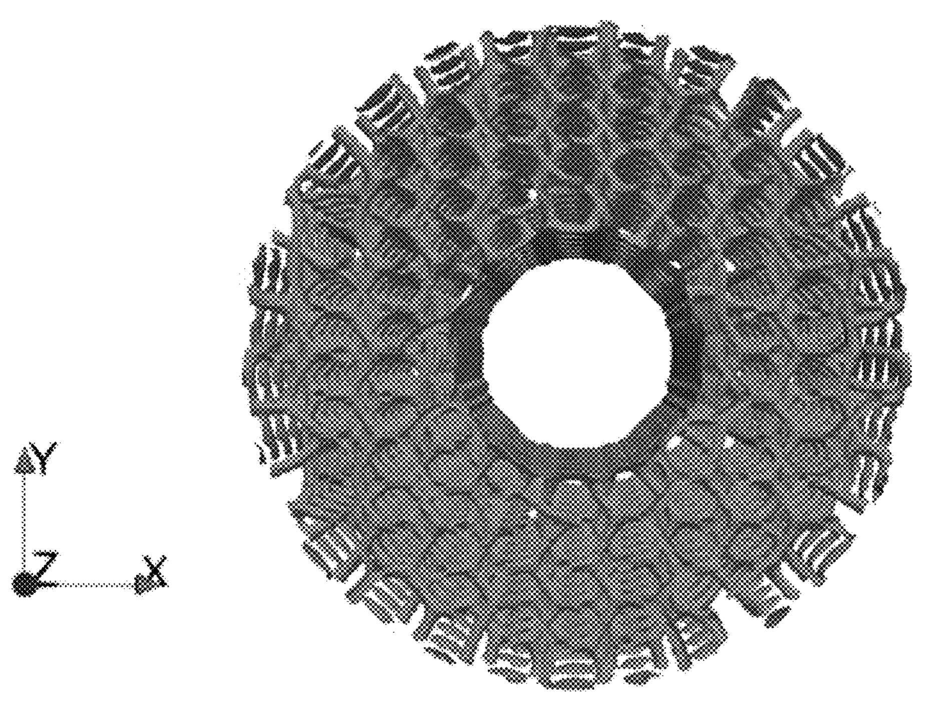
FIG. 11 illustrates a top view of a cylindrical shaped structure including a hollow axial core based upon a BPII phase [110] crystal including coaxial inner and outer surfaces with homeotropic anchoring at the inner surface and planar anchoring at the outer surface.

In some embodiments, a macroscopic structure can be based upon a BP crystal that has been modified to include one or more curved surfaces, optionally in conjunction with other modifications to the lattice structure such as surface anchoring. For example, FIG. 3 illustrates a top view and FIG. 4 illustrates a perspective view of a structure based upon a BPII phase [111] crystal upon curving of the crystal around a central axis to form a cylindrical shaped structure including an open core in the axial direction of the cylinder. FIG. 5 and FIG. 6 illustrate a similar structure based upon a BPII [100] crystal and FIG. 7 and FIG. 8 illustrate a similar structure based upon a BPII [110) crystal. In these embodiments, the BPII phase liquid crystals upon which the structures are based also includes homeotropic anchoring at both the inner and outer axial surfaces of the crystal, which is reflected in the formed structure.

FIGS. 9-20 illustrate additional examples of cylinder shaped structures based upon BP crystals that have been curved to encircle an axial core. The structures vary with regard to different coordination numbers and different anchoring mechanisms on the inner and outer curved surfaces, with FIG. 9 being based upon a BPII phase [111] crystal, FIG. 10 being based upon a BPII [100] crystal, and FIG. 11 being based upon a BPII phase [110] crystal, all three crystals including homeotropic anchoring at the inner curved surface and planar anchoring at the outer curved surface.

Figure 12:
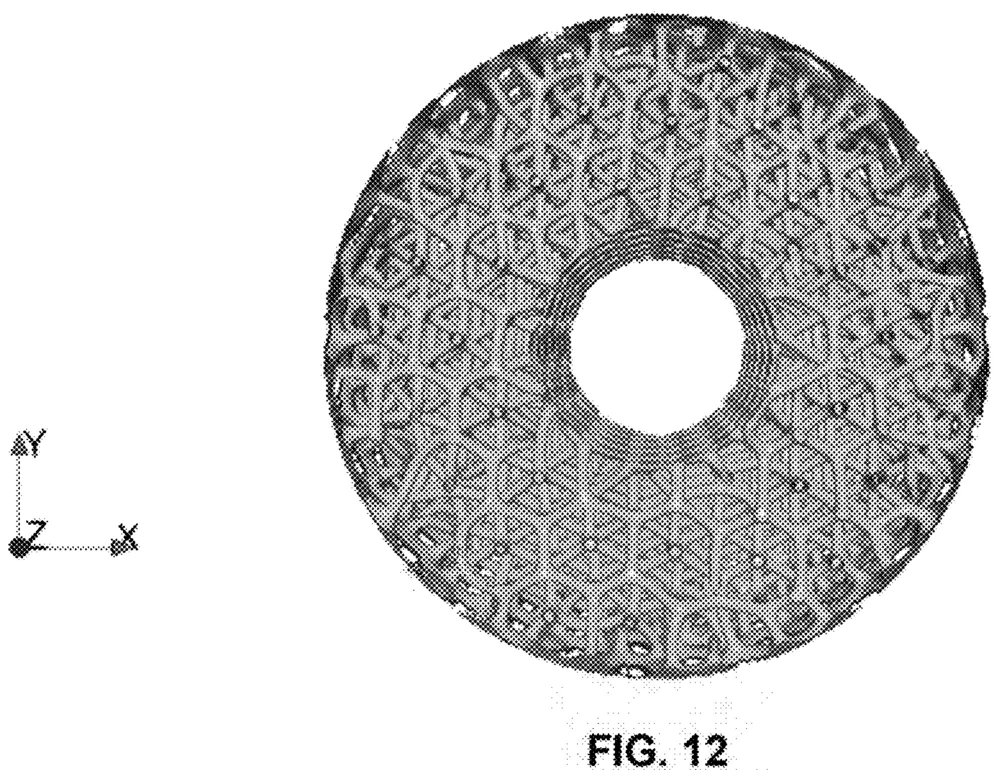
FIG. 12 illustrates a top view of a cylindrical shaped structure including a hollow axial core based upon a BPII phase [111] crystal including coaxial inner and outer surfaces with planar anchoring at the inner surface and homeotropic anchoring at the outer surface.
Figures 13, 14:
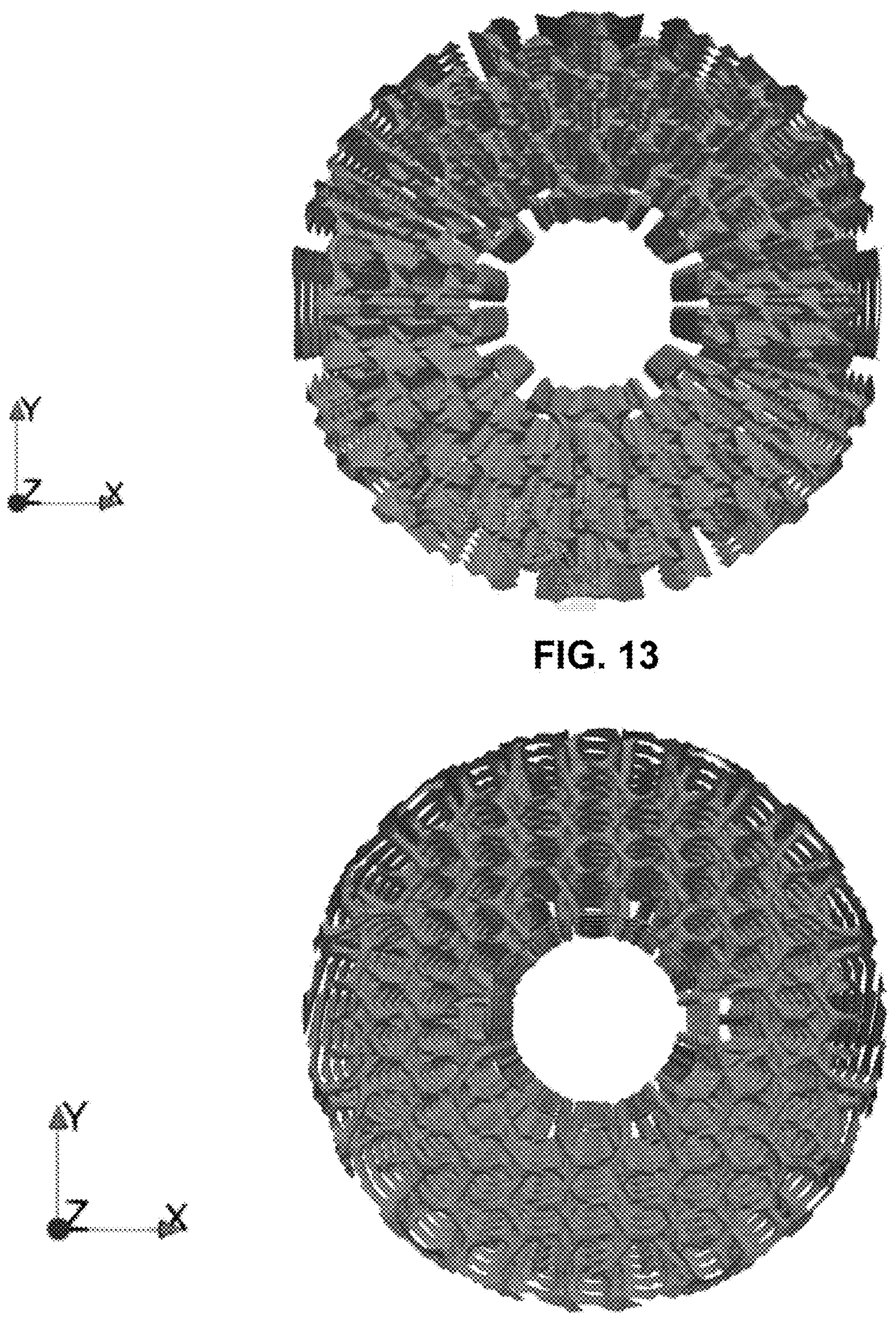
FIG. 13 illustrates a top view of a cylindrical shaped structure including a hollow axial core based upon a BPII phase [100] crystal including coaxial inner and outer surfaces with planar anchoring at the inner surface and homeotropic anchoring at the outer surface.
FIG. 14 illustrates a top view of a cylindrical shaped structure including a hollow axial core based upon a BPII phase [110] crystal including coaxial inner and outer surfaces with planar anchoring at the inner surface and homeotropic anchoring at the outer surface.

The structures of FIG. 12, FIG. 13, and FIG. 14 mimic the disclination networks of a BPII phase [111] crystal, a BPII [100] crystal, and a BPII [110] crystal, respectively, with all three crystals including planar anchoring at the inner curved surface and homeotropic anchoring at the outer curved surface.

Figure 15:
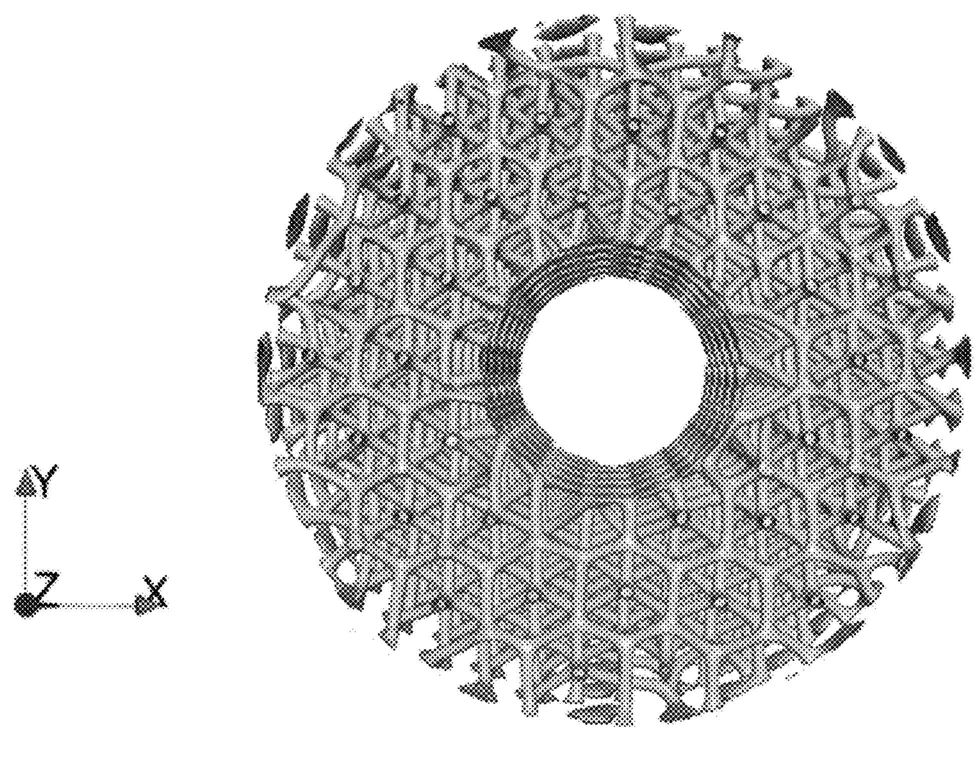
FIG. 15 illustrates a top view of a cylindrical shaped structure including a hollow axial core based upon a BPII phase [111] crystal including coaxial inner and outer surfaces with planar anchoring at both the inner and outer surface.
Figure 16:
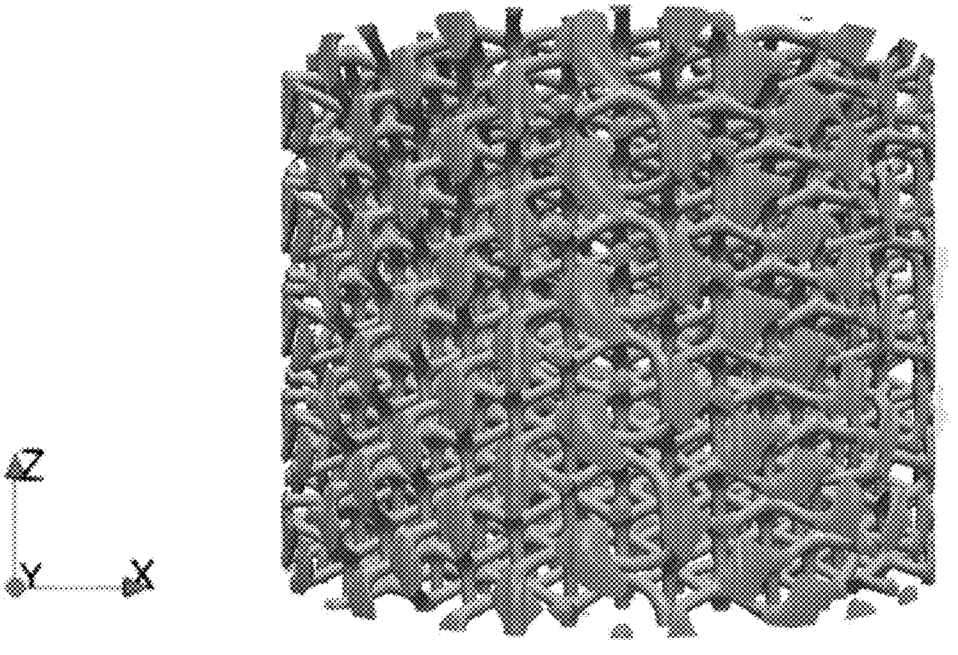
FIG. 16 illustrates a side view of the structure of FIG. 15.
Figure 17:
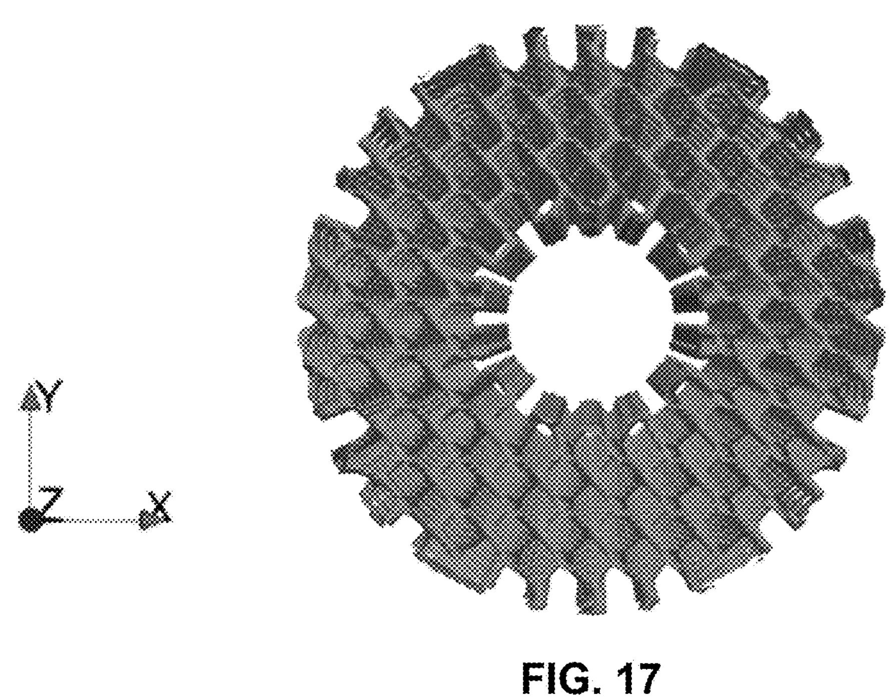
FIG. 17 illustrates a top view of a cylindrical shaped structure including a hollow axial core based upon a BPII phase [100] crystal including coaxial inner and outer surfaces with planar anchoring at both the inner and outer surface.
Figure 18:
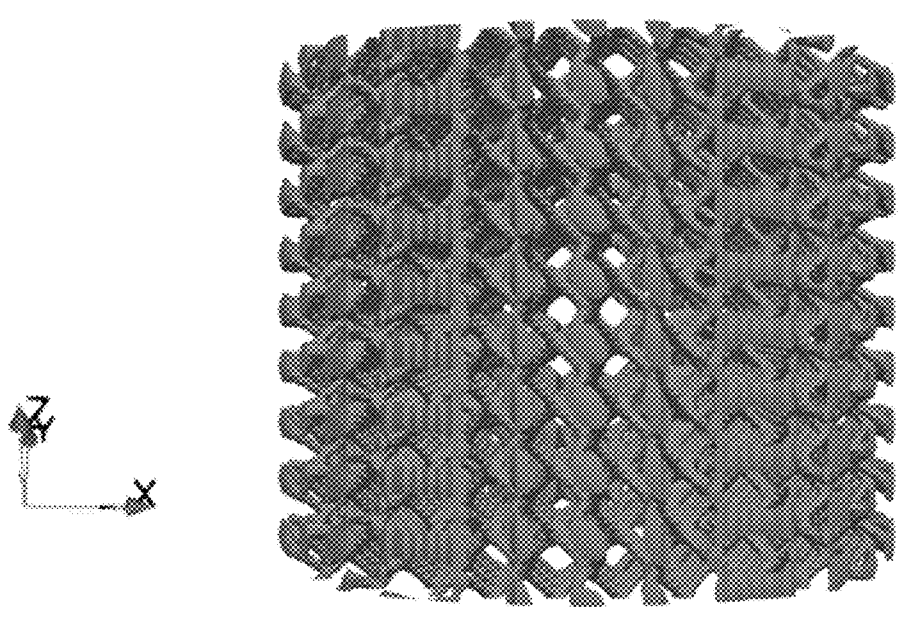
FIG. 18 illustrates a side view of the structure of FIG. 17.
Figures 19, 20:
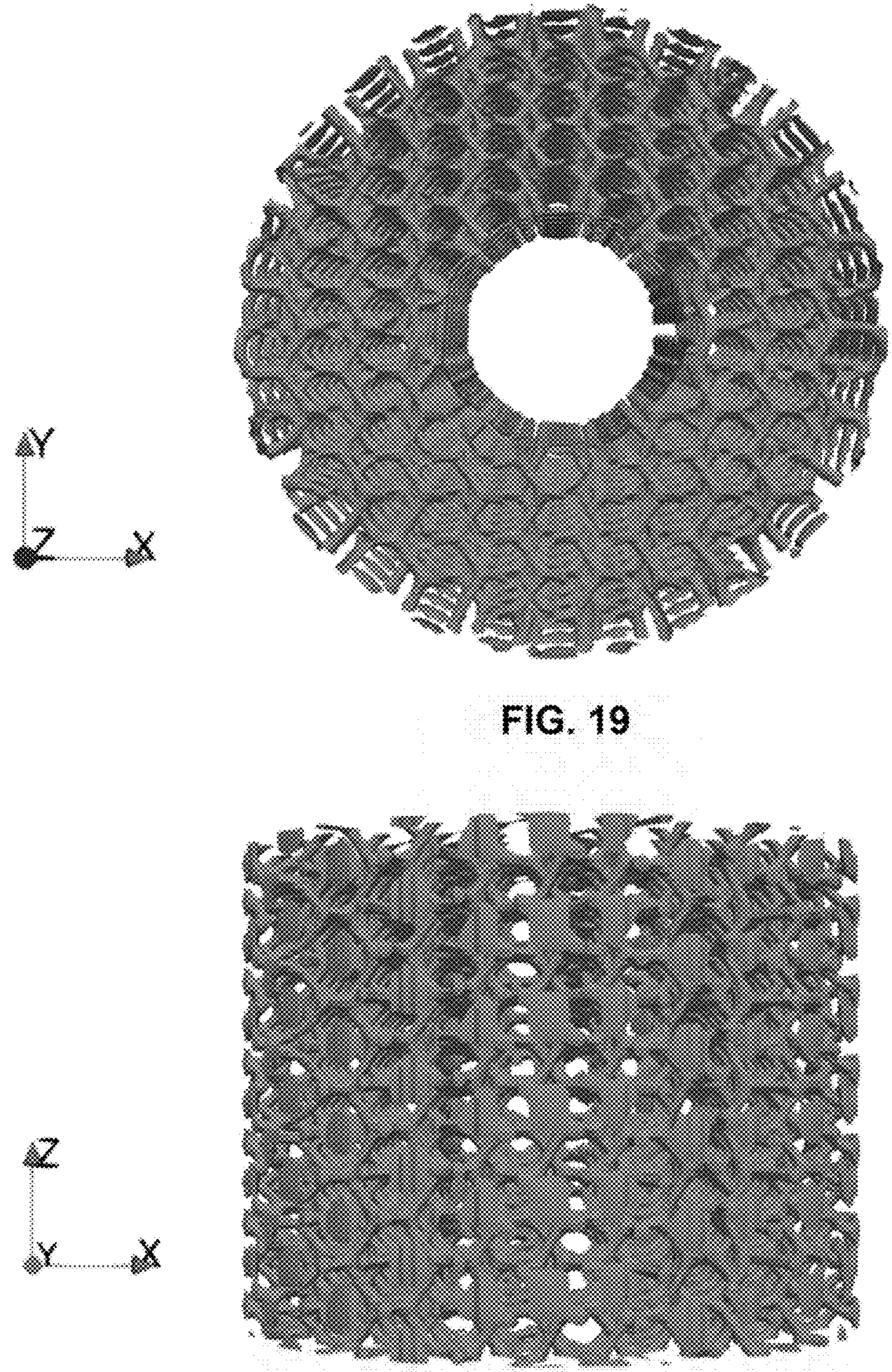
FIG. 19 illustrates a top view of a cylindrical shaped structure including a hollow axial core based upon a BPII phase [110] crystal including coaxial inner and outer surfaces with planar anchoring at both the inner and outer surface.
FIG. 20 illustrates a side view of the structure of FIG. 19.
Figure 21:
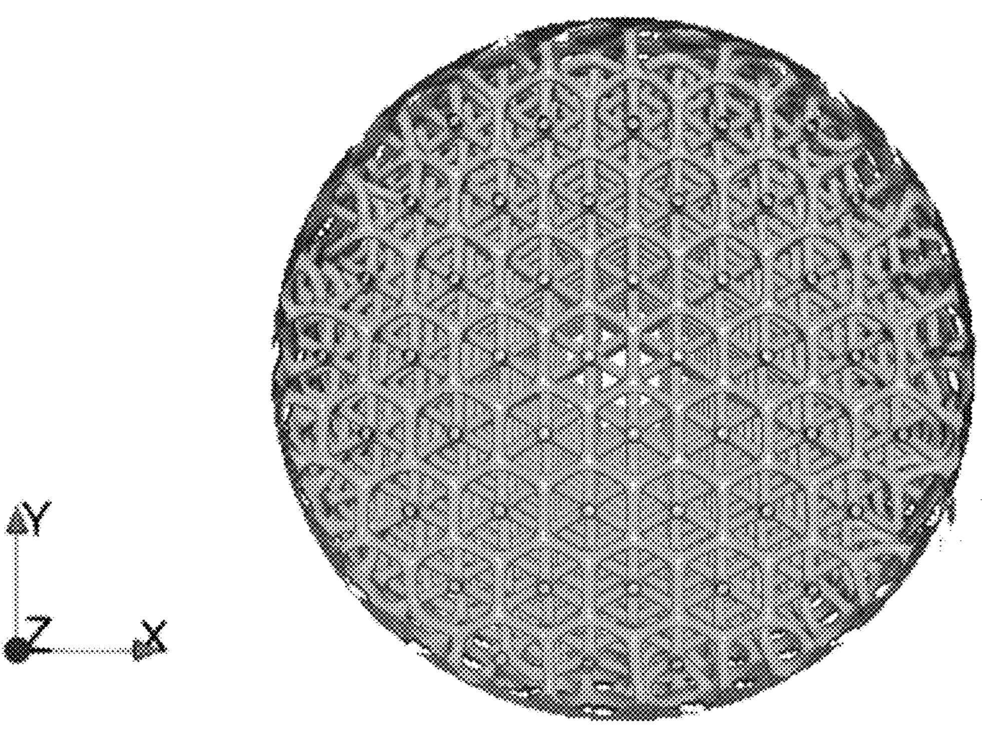
FIG. 21 illustrates a top view of a cylindrical-shaped structure based upon a BPII phase [111] crystal including homeotropic anchoring at the outer surface.
Figure 22:
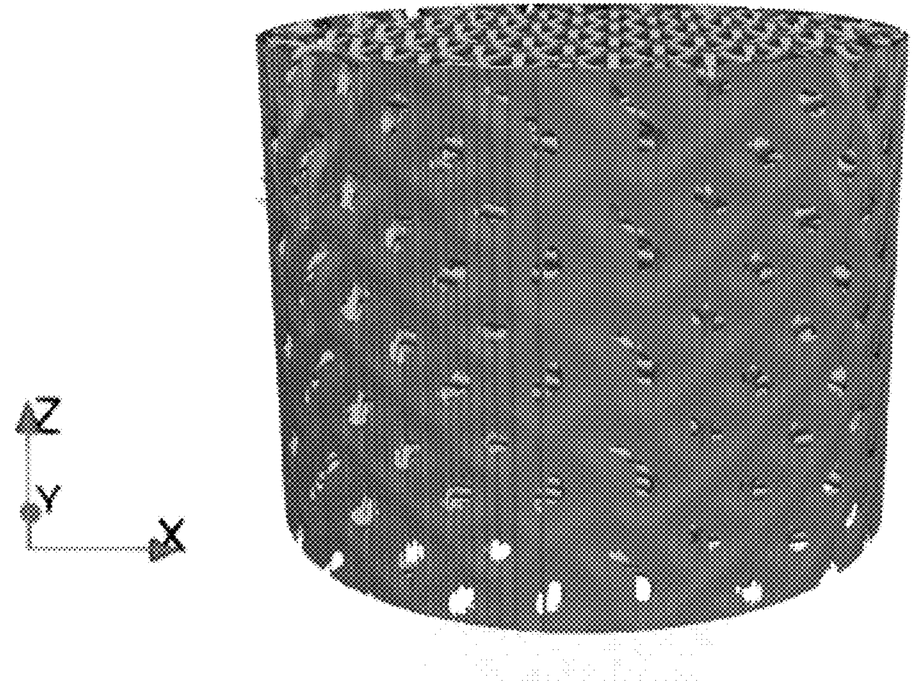
FIG. 22 illustrates a perspective view of the structure of FIG. 21.
Figure 23:
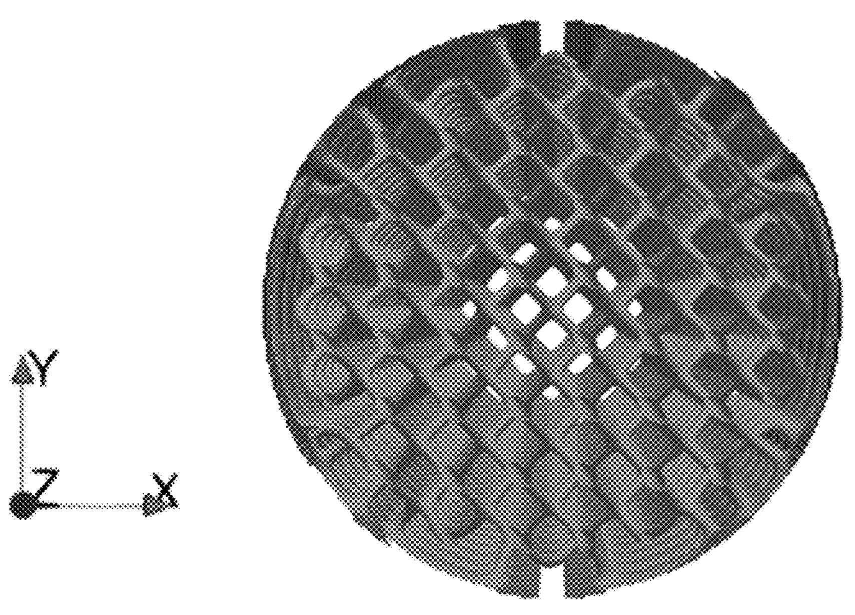
FIG. 23 illustrates a top view of a cylindrical-shaped structure based upon a BPII phase [100] crystal including homeotropic anchoring at the outer surface.
Figure 24:
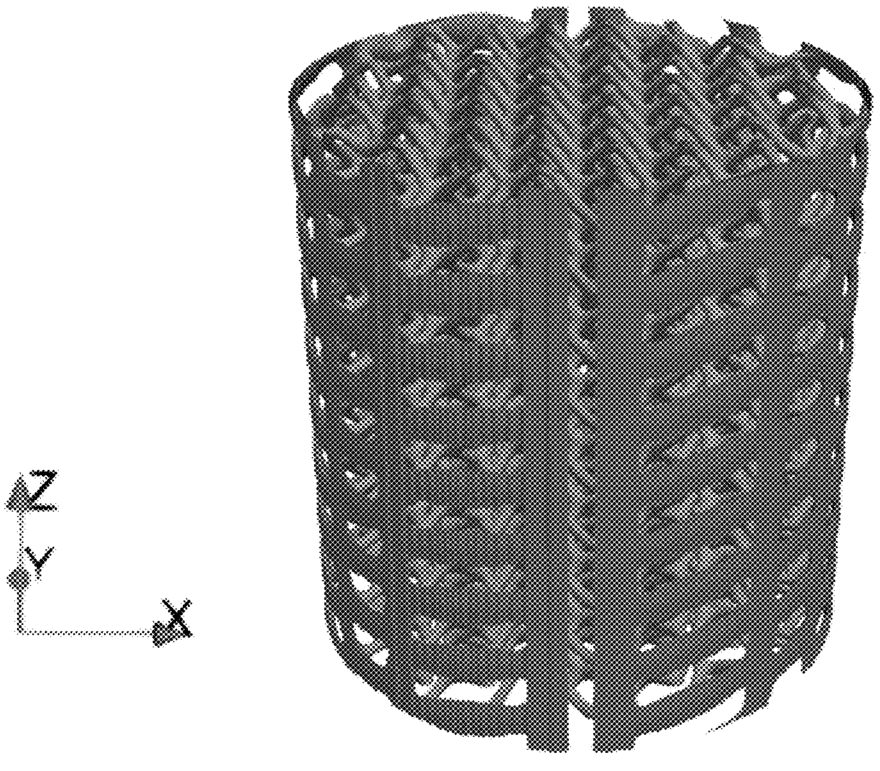
FIG. 24 illustrates a perspective view of the structure of FIG. 23.
Figure 25:
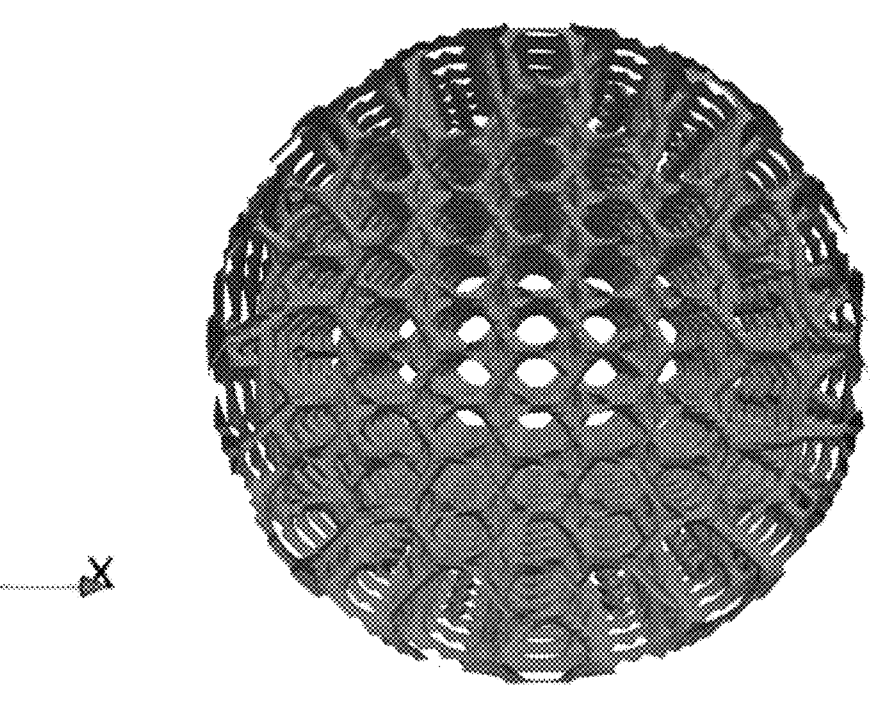
FIG. 25 illustrates a top view of a cylindrical-shaped structure based upon a BPII phase [110] crystal including homeotropic anchoring at the outer surface.
Figure 26:
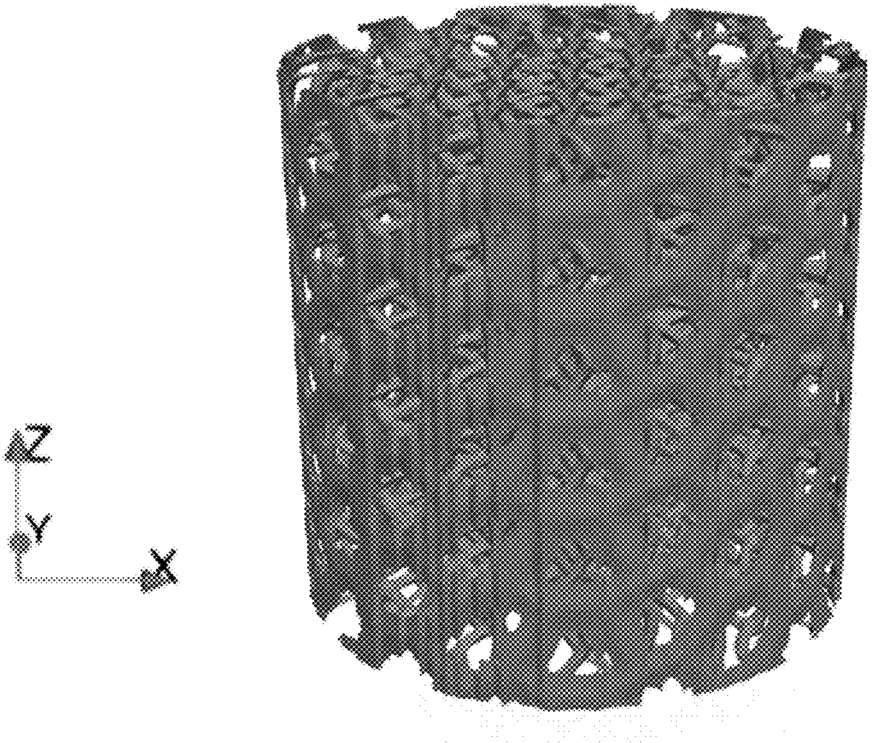
FIG. 26 illustrates a perspective view of the structure of FIG. 25.
Figure 27:
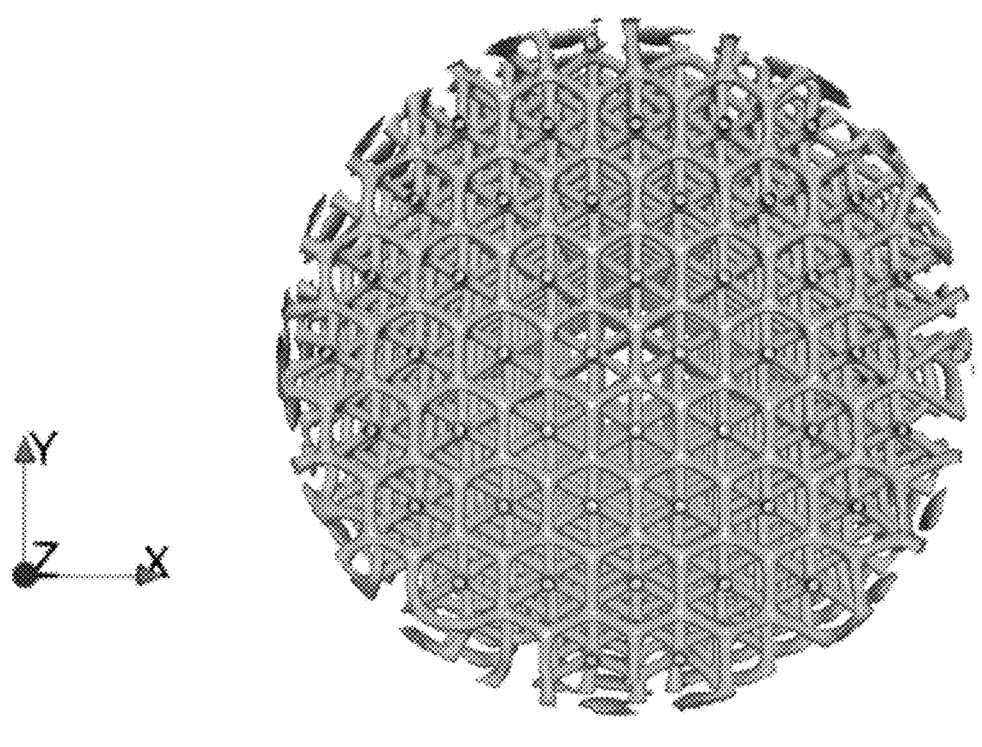
FIG. 27 illustrates a top view of a cylindrical-shaped structure based upon a BPII phase [111] crystal including planar anchoring at the outer surface.
Figure 28:
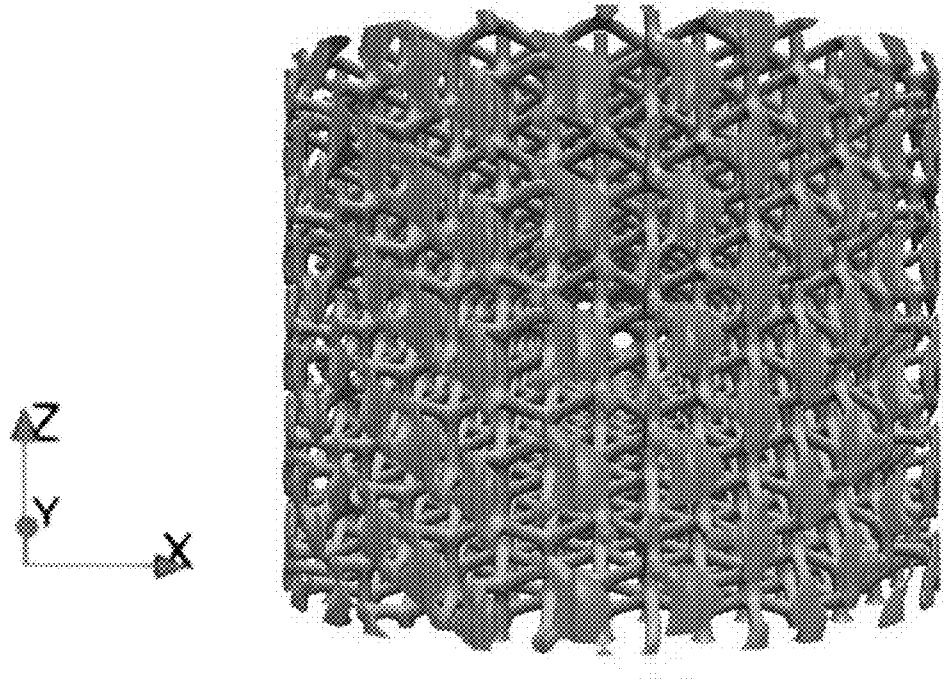
FIG. 28 illustrates a side view of the structure of FIG. 27.
Figures 29, 30:
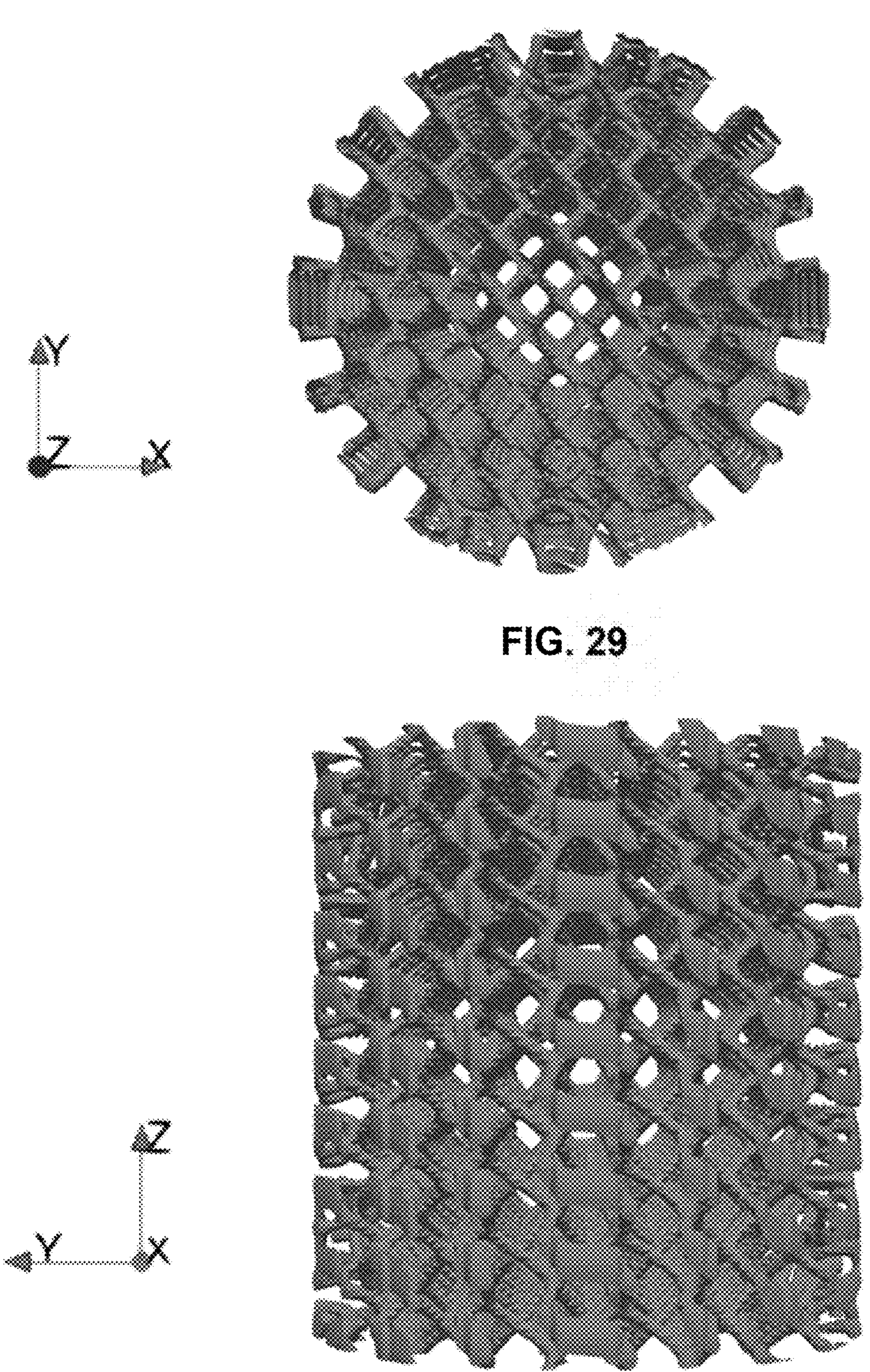
FIG. 29 illustrates a top view of a cylindrical-shaped structure based upon a BPII phase [100] crystal including planar anchoring at the outer surface.
FIG. 30 illustrates a side view of the structure of FIG. 29.
Figure 31:
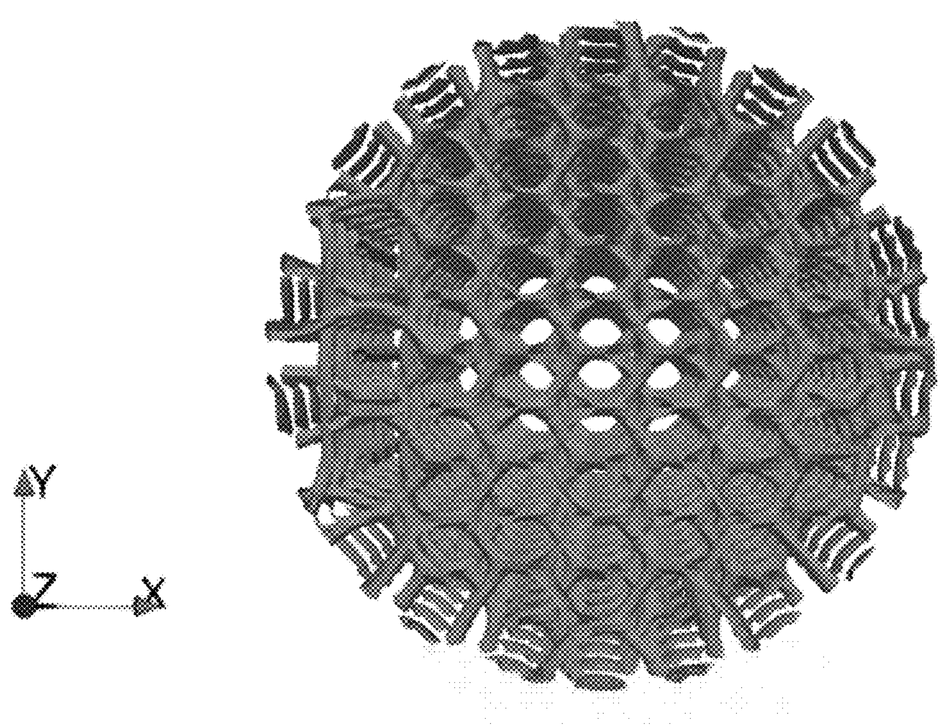
FIG. 31 illustrates a top view of a cylindrical-shaped structure based upon a BPII phase [110] crystal including planar anchoring at the outer surface.
Figure 32:
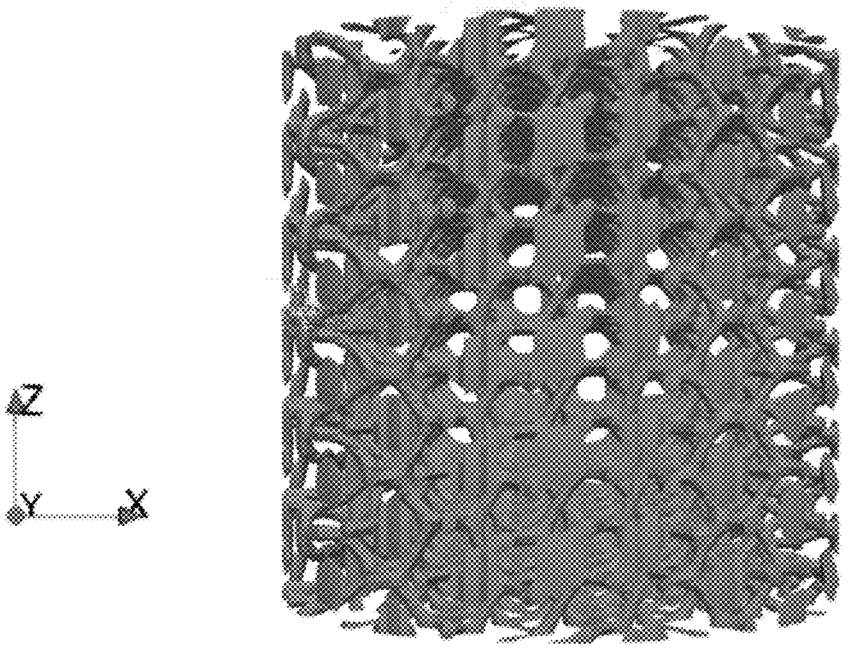
FIG. 32 illustrates a side view of the structure of FIG. 31.

The structure of FIG. 15 and FIG. 16 mimics the disclination network of a BPII phase [111] crystal, the structure of FIG. 17 and FIG. 18 mimic the disclination network of a BPII phase [100] crystal, and the structure of FIG. 19 and FIG. 20 mimic the disclination network of a BPII phase [110] crystal, with all three crystals including planar anchoring at both the inner and outer curved surface.

FIG. 21-FIG. 26 illustrate top and perspective views of macroscopic structures based upon the disclination patterns of BPII phase [111], [100] and [110] crystals, respectively, that include an outer surface defining a curvature around a central axis to form a cylindrical structure. In addition to the curvature at the exterior surface, the BP crystals structures mimicked by the structures of FIG. 21-FIG. 26 include homeotropic anchoring at the curved outer surface.

FIG. 27-FIG. 32 illustrate to and side views of macroscopic structures based upon the disclination patterns of BPII phase [111], [100] and [110] crystals, respectively, that include an outer surface defining a curvature around a central axis to form a cylindrical structure. In addition to the curvature at the exterior surface, the BP crystals structures mimicked by the structures of FIG. 27-FIG. 32 include planar anchoring at the curved outer surface.

Figure 33:
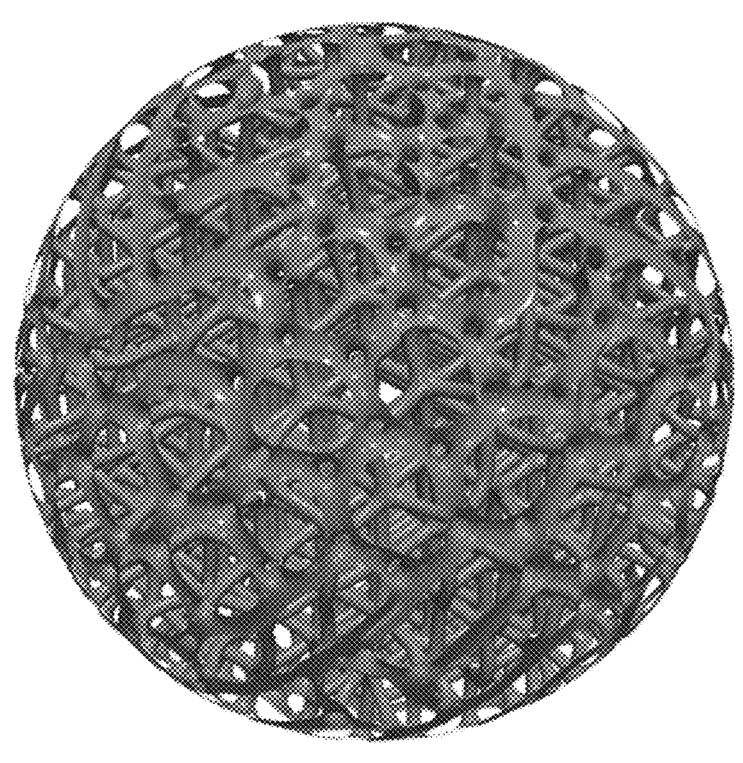
FIG. 33 illustrates a spherical-shaped structure based upon a BPII phase [111] crystal and including homeotropic anchoring at the outer surface.
Figure 34:
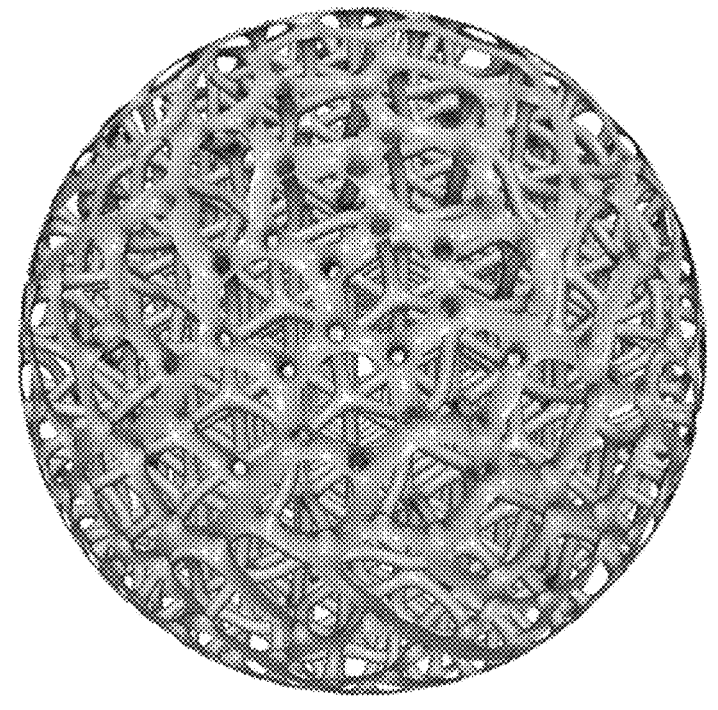
FIG. 34 illustrates a different view of the spherical-shaped structure of FIG. 33.
Figure 35:
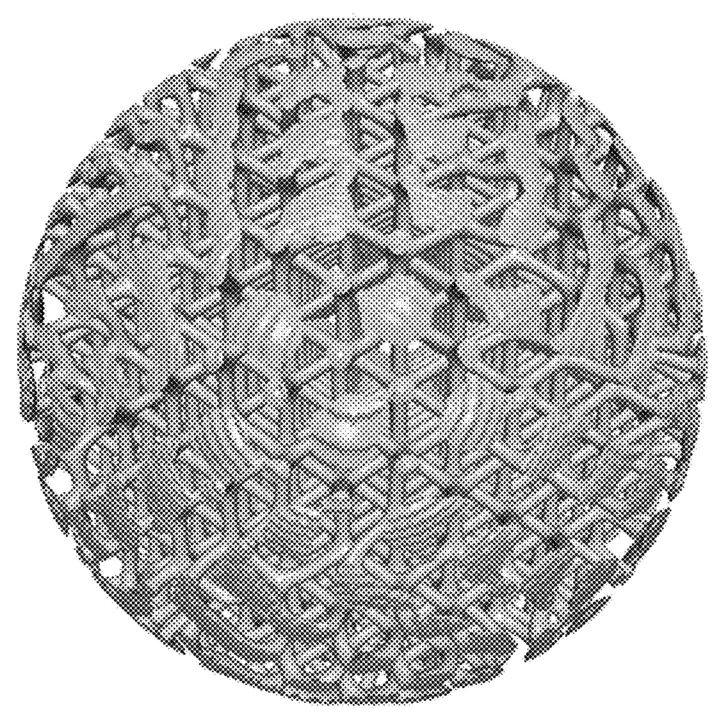
FIG. 35 illustrates a spherical-shaped structure based upon a BPII phase [111] crystal and including planar anchoring at the outer surface.
Figure 36:
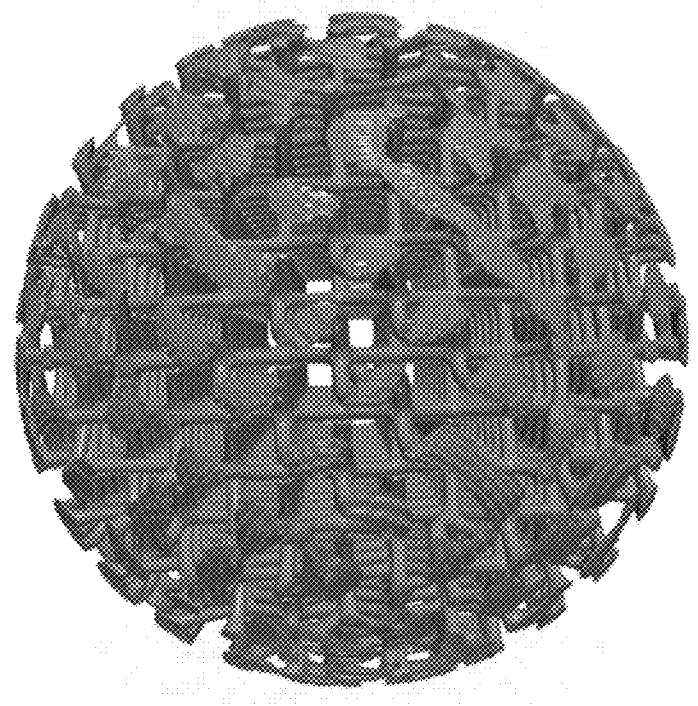
FIG. 36 illustrates a different view of the spherical-shaped structure of FIG. 35.

Examples of spherical structures as may be formed according to disclosed methods are illustrated in FIG. 33-FIG. 36. FIG. 33 and FIG. 34 present two views of a macroscopic spherical structure based upon the disclination pattern of a BPII [111] crystal formed in the shape of a spherical droplet and including homeotropic anchoring at the outer surface, and FIGS. 35 and 36 illustrate two views of a macroscopic spherical structure based upon the disclination pattern of a BPII [111] crystal formed in the shape of a spherical droplet and including planar anchoring at the outer surface.

Figure 37:
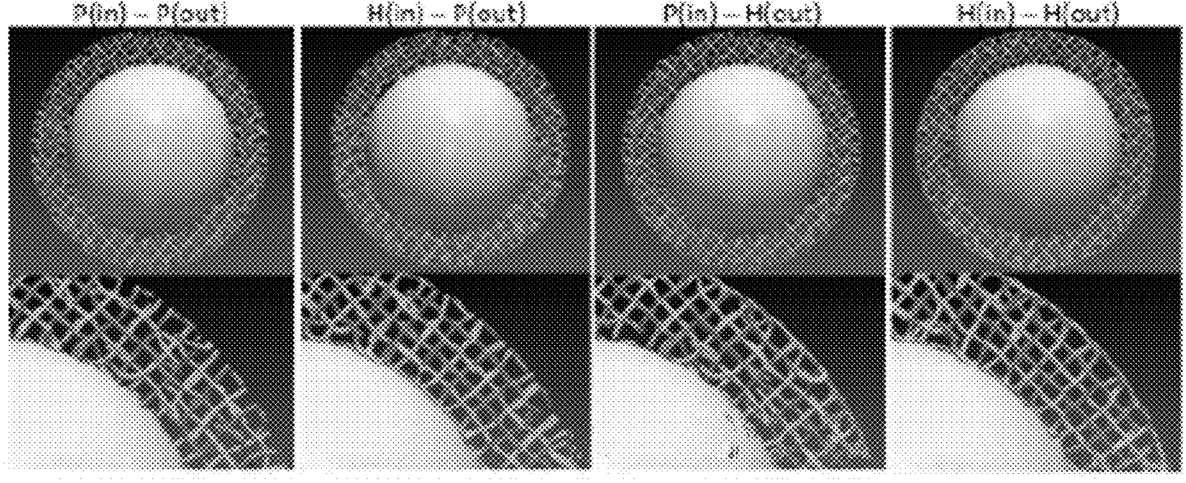
FIG. 37 illustrates cross-sectional images of BP disclination patterns of BPI phase crystals confined in a spherical shell and formed with different boundary anchoring conditions.

Spherical BP crystals that can be utilized to develop a macroscopic structure can also include a hollow core, and thus include curvature at both an inner and an outer surface of a spherical shell-shaped crystal. By way of example, FIG. 37 illustrates spherical shell-shaped BP crystals in the BPI phase that include disclination patterns in a shell as may be utilized information of a macroscopic structure exhibiting auxetic characteristics. As indicated, the spherical shell crystals include surface anchoring at both the inner and outer surfaces of the shells, including planar anchoring at both surfaces (far left), homeotropic anchoring on the inner surface and planar anchoring on the outer surface (second from left), planar anchoring on the inner surface and homeotropic anchoring on the outer surface (second from right), and homeotropic anchoring at both surfaces (far right).

Figure 38:
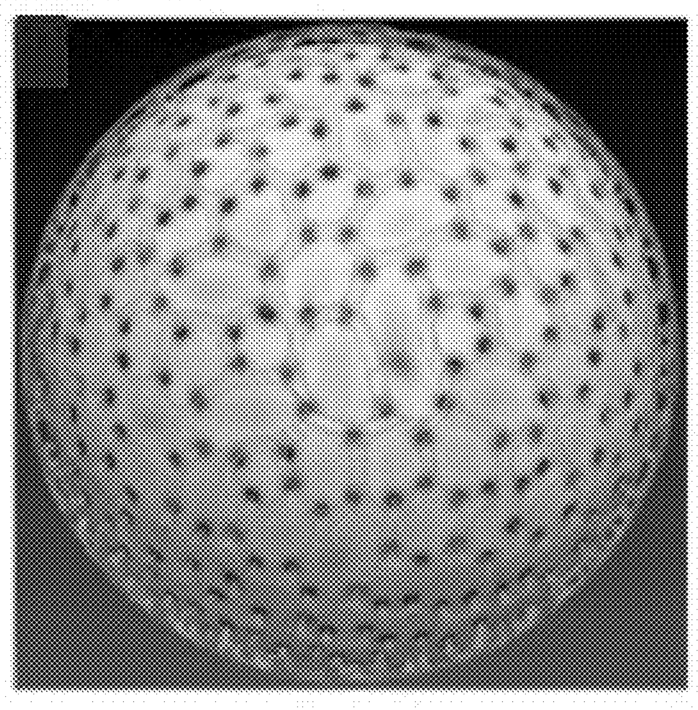
FIG. 38 illustrates a disclination pattern of a BPII phase [100] crystal confined in a spherical shell with inner planar and outer homeotropic surface anchoring and thickness to pitch ratio of 1.5.
Figure 39:
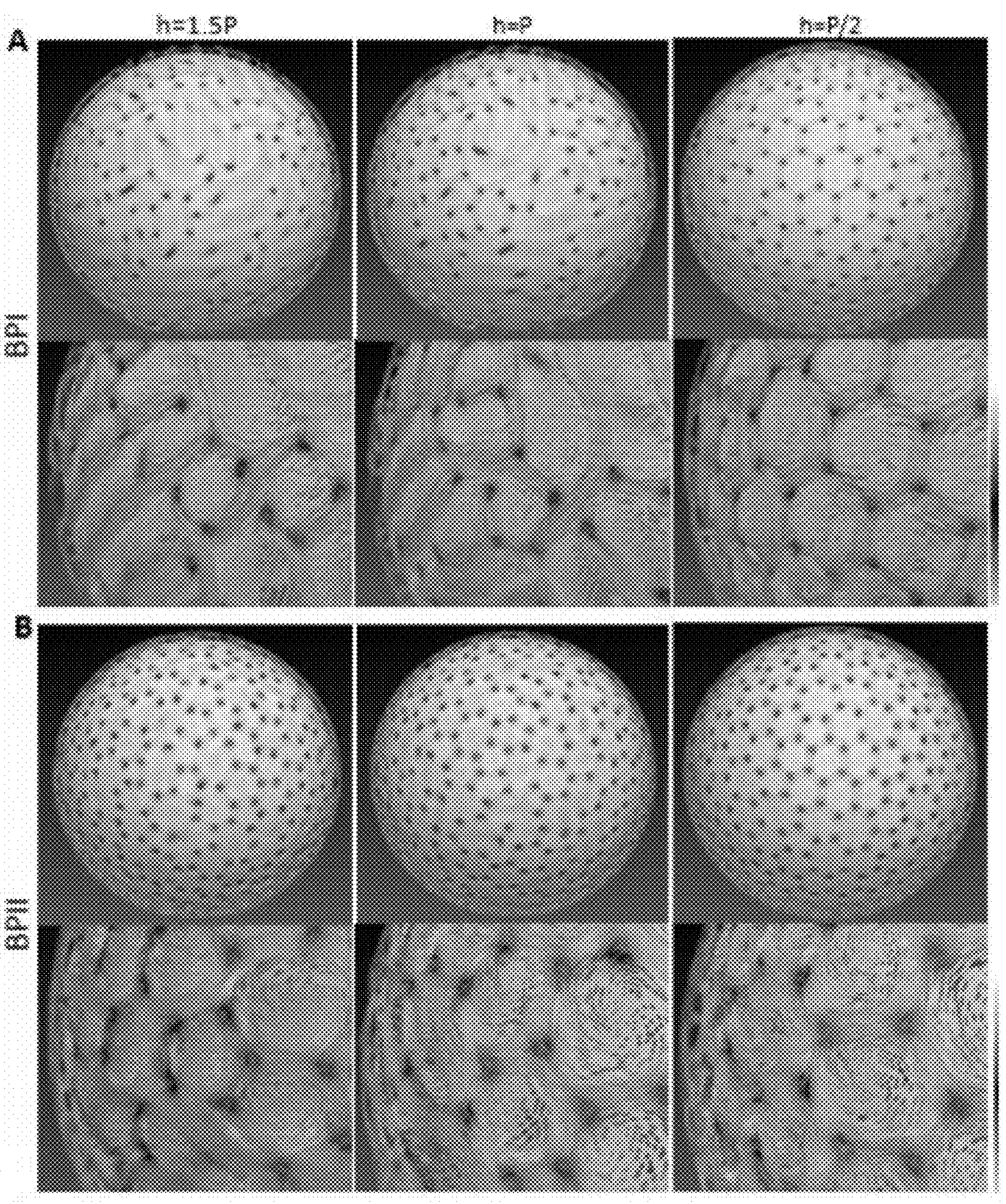
FIG. 39 illustrates disclination patterns of BPI (A) and BPII (B) phases for BP crystals confined in spherical shells and changes to the patterns upon reducing the shell thickness (h) from 1.5 times the pitch (p) to 0.5 p.

The spherical shell BP crystal of FIG. 38 is illustrated at the BPII thermal conditions and has been designed to include a shell thickness (h) that is about 1.5 times the pitch (p) of the chiral structure. As can be seen, this crystal includes skyrmion lattice deformations, which can be incorporated in a macroscopic structure based upon the BP crystal in some embodiments. FIG. 39 illustrates additional examples of skyrmion structure development on the spherical shell BP crystals as may be utilized. As indicated, the patterns can be based upon BP crystals at the BPI phase (A, top panels) or the BPII phase (B, bottom panels) and with a variety of shell thicknesses, e.g., with a ratio of shell thickness to lattice pitch of from about 0.5 to about 1.5.

It should be understood that the various bulk crystal shapes represented in the figures are exemplary embodiments only, and the BP crystals upon which the macroscopic structures are based are not limited to the illustrated examples. Moreover, it should be understood that while the illustrated disclination patterns illustrate the material in a positive fashion, i.e., solid material forming the disclination pattern, macroscopic structures as disclosed can likewise incorporate the mimicked pattern in a negative fashion, i.e., solid material surrounding a void that describes the disclination pattern.

To form a macroscopic structure exhibiting auxetic, NPR, or ZPR characteristics, a disclination pattern of a BP liquid crystal can be mapped. Upon the mapping of the disclination pattern, the resulting map can then be scaled up to provide a pattern for formation of a macroscopic structure exhibiting desirable characteristics. In one embodiment, described in more detail below, the disclination pattern of a liquid crystal can be mapped by applying the continuum Landau-De Gennes theoretical model, which can computationally simulate the formation and arrangement of disclination lines in BPI and BPII phase liquid crystals at different temperatures and under various geometries (for example flat film with different thicknesses, curvatures, hollow portions, etc.) and boundary conditions (constrained, anchored, etc.). The resulting nanostructure disclination pattern can then be scaled up to provide a pattern for a macroscopic structure. The scaling factor is not particularly limited. In one embodiment, a disclination pattern can be scaled up from a nanometer to micrometer scale, e.g., a direct scaling of 1,000. However, other values are encompassed herein, and the scaling value of the disclination pattern can generally be any value of about 10 or greater, such as about 500 or greater, about 1,000 or greater, such as from about 100 to about 5,000 in some embodiments. For instance, the nodal pitch of a BP crystal (i.e., the distance between connected nodes of the lattice, which differs from the chiral pitch of the crystal) is generally on the nanometer scale, e.g., from about 10 to several hundred nanometers. In forming a macroscopic structure, the mimicked disclination pattern can include a nodal pitch that is scaled up from the BP crystal pitch by a factor of about 10 or more, e.g., providing a nodal pitch in the pattern of the macroscopic structure on the micrometer, millimeter, or centimeter scale, such as incorporating a nodal pitch of from about 500 nanometers to about 100 centimeters, from about 1 micrometer to about 10 centimeters, from about 100 micrometers to about 1 centimeter, or from about 500 micrometers to about 100 millimeters, in some embodiments.

Software can be utilized to read and scale up the nanostructure patterns of the disclination maps. For instance, ParaView or Blender Software (open-source 3D computer graphics softwares) or any other suitable software known in the art can be utilized to read and scale up the nanostructure pattern of the disclination lines.

Following the mapping, all or a portion of the mapped disclination pattern of a BP crystal can be utilized in forming a macroscopic structure. For instance, a macroscopic structure can include a scaled-up version of a single layer of a crystal lattice, mimicking an essentially two-dimensional crystal, or can include multiple layers of a crystal lattice, and thereby mimicking a three-dimensional crystal. Moreover, the bulk shape of the macroscopic structure can likewise mimic the bulk shape of the BP crystal on which it is based or alternatively, the bulk shape of the macroscopic structure can differ from that of the BP crystal. In addition, the mimicked disclination pattern can form only a portion of the macroscopic structure or the entire macroscopic structure. For instance, a portion of a macroscopic structure can mimic the disclination pattern of the BP crystal and this portion can be adjacent to another portion, e.g., a strut, a cap, a support, etc.

In one embodiment, a manufacturing process can be carried out according to an additive manufacturing protocol, e.g., a 3D printing manufacturing process. Additive manufacturing refers to any method for forming a two- or three-dimensional object in which materials are deposited according to a controlled deposition and/or solidification process. The main differences between additive manufacturing processes are the types of materials to be deposited and the way the materials are deposited and solidified. Some methods extrude materials including liquids (e.g., melts or gels) and extrudable solids (e.g., clays or ceramics) to produce a layer, followed by spontaneous or controlled curing of the extrudate in the desired pattern. Other processes deposit solids in the form of powders or thin films, followed by the application of energy and/or binders often in a focused pattern to join the deposited solids and form a single, solid structure having the desired shape. In some methods, successive layers are individually treated to solidify the deposited material prior to deposition of the succeeding layer, with each successive layer becoming adhered to the previous layer during the solidification process.

In general, any additive manufacturing process can be utilized in conjunction with disclosed processes and in formation of a manufactured structure. Additive manufacturing processes encompassed can include, without limitation, selective laser sintering (SLS), fused deposition modeling (FDM), selective laser melting (SLM), stereolithography (SLA), electron beam melting (EBM), Laser Engineered Net Shaping™ (LENS®), laser cladding, digital light processing (DLP), and so forth.

Additive manufacturing processes can differ from one another with regard to the composition and phase of the materials used to form individual layers as well as with regard to the method utilized to deposit and/or solidify the layer/structure. For instance, disclosed methods can be utilized with additive manufacturing processes that deposit the formation materials as a liquid as well as with additive manufacturing processes that deposit the formation materials in a solid phase.

Materials that can be utilized to form the structures can encompass materials configured for additive manufacturing (e.g., SLA; liquid, gel, or powder deposition, etc.) including, without limitation, thermosets (e.g., acrylics or epoxies), thermoplastics (e.g., polyolefins, polystyrenes, polyvinyl chloride, polyurethanes, elastomeric thermoplastics, polycarbonates, polyamides, etc.), rubbers including silicone rubbers, and so forth. In some embodiments, the structure can be formed of a relatively soft, pliable material, for instance a polymer composition that exhibits a Shore A hardness, such as a Shore A hardness of about 20 to about 90, such as about 40 to about 85 in some embodiments.

In one embodiment, a macroscopic structure can be manufactured according to an SLA formation process. SLA generally includes location of a precursor build material within a confined area (e.g., a vat) and targeted utilization of photopolymerization, e.g., by use of an ultraviolet (UV) laser, to cure the precursor material in the desired pattern. In general, the precursor material is cured via crosslink or polymerization of the precursor material so as to solidify and form the macroscopic structure. In some embodiments, the precursor material can be a liquid, for instance a liquid held in a bath, and the precursor can be solidified through exposure to a UV laser one layer at a time according to a predetermined pattern. For instance, a formation stage can be submerged in the liquid formation material, and a pattern can be traced in the liquid by a suitable energy source to solidify a first area of the formation material. As the stage is lowered in the bath, subsequent areas of the formation material can be solidified to build the final structure.

In one embodiment, an additive manufacturing process can be used in which the formation material is extruded to form the successive layers of the final structure. For instance, a liquid phase material can be deposited in the form of a gel or suitably high viscosity liquid that can be extruded in the desired pattern. For example, a polymer melt or precursor can be deposited via extrusion in a desired pattern and the extrudate can then be cured through, e.g., a change in temperature (e.g., spontaneously upon deposition) or via crosslinking (e.g., a UV or otherwise actively initiated photo-curing mechanism). Following, another layer or area of the extrudate can be applied, followed by cure, and so on to build the entire three-dimensional structure. Alternatively, successive areas (e.g., layers) of the extrudate can be built up and the entire structure can be cured in a single process. For instance, successive areas of an extrudate can be deposited to form a green structure, and the entire structure can be cured in a single step.

A formation material can alternatively be deposited in the form of a powder to form a single area (e.g., a layer), and select areas of the powder layer can then be cohered according to the desired pattern to solidify the powder in the desired pattern and form a single layer of the structure. Following, another area of the powder can be deposited, the solidification process can be repeated, and the entire object can be produced. Powder deposition techniques can be beneficial in some embodiments as the excess powder that is not solidified can surround and support the structure during formation. This support can provide for the formation of more complicated structures. For instance, a powder or extrudate of the desired formation material can be deposited in a layer generally on the order of about 1000 micrometers (μm) in thickness or less, about 500 μm in thickness or less, or about 100 μm in thickness or less. A powder grain size is not particularly limited, and can be, e.g., about 500 μm or less in average size, about 200 μm or less in average size, about 100 μm or less in average size, or about 50 μm in less in average size in some embodiments.

Materials may cohere spontaneously upon deposition, for instance in the case of a fused deposition method utilizing an extrusion deposition process (e.g., a polymeric melt). Alternatively, cohesion of the material can be actively instigated or encouraged, e.g., in SLA processes. For example, when considering a deposition process, a binder material can be deposited on a layer of the formation material according to the desired pattern and can bind the formation material to a cohesive solid. For example, an inkjet printer can be used to deposit a binder on a previously formed layer. The binder can be, e.g., water, an acrylate binder, an epoxy, etc. as is known in the art and can include a dye or other additive as is known.

Irrespective of the particular method utilized in the additive manufacturing process, the method can generally have optimum processing parameters to produce the desired structure. These parameters can vary depending upon the specific build technique, the formation material(s), the geometry of the structure being formed, the final characteristics desired for the structure being formed, etc. Processing parameters can include both the parameters of the deposition as well as the parameters of the coherence. By way of example, processing parameters can include the rate of deposition of the formation material, the rate of deposition of any binding material, the temperature of the formation material and/or binding material during or following deposition, the characteristics of the binding energy (e.g., the power of focused energy), the deposition and/or cohesion conditions (e.g., temperature, pressure, humidity, etc.), the rate of cohering the formation material, and so forth.

Consistent material properties can be assured throughout a structure formed according to an additive manufacturing process by maintaining the processing parameter consistently throughout the process.

Disclosed methods and materials formed thereby that are capable of remaining inert or responding reversibly to environmental variates is of practical importance in various fields of engineering including, without limitation, sensors (e.g., piezoelectric sensors), light energy saving parts, actuated membranes, actuated filters, acoustic dampeners, stress mitigation materials, sporting apparel including helmets and shoes, smart textiles, biomedical applications such as surgical stents, sutures, and wound dressings, biomedical devices such as implants, dental scaffold, prosthesis, military applications such as protective armors, projectiles and aeronautics and tissue engineering applications (e.g., formation of artificial cartilage, ligaments, corneal, or brain tissues), stress mitigation materials as may be useful in the building and automobile industries, among others.

The present disclosure may be better understood with reference to the Examples set forth below.

Example 1

A BP crystal mixture was prepared by doping 37 wt. % of a chiral molecule (S811, Merck) into 63 wt. % of a benzotriazole-based nematic liquid crystal (MLC2142; EMD Chemical). The mixture was prepared according to a co-solvent method in which the solvent was evaporated after initial formation using a rotary evaporator. Liquid crystal flat films and curved shells were formed. Core-shell liquid crystal constructs included a middle phase (liquid crystal) surrounded by internal (core) and external aqueous phases.

The crystal flat films were made by capillary filling of a cell that included two coverslips separated by 12 μm spacer.

Figure 40:
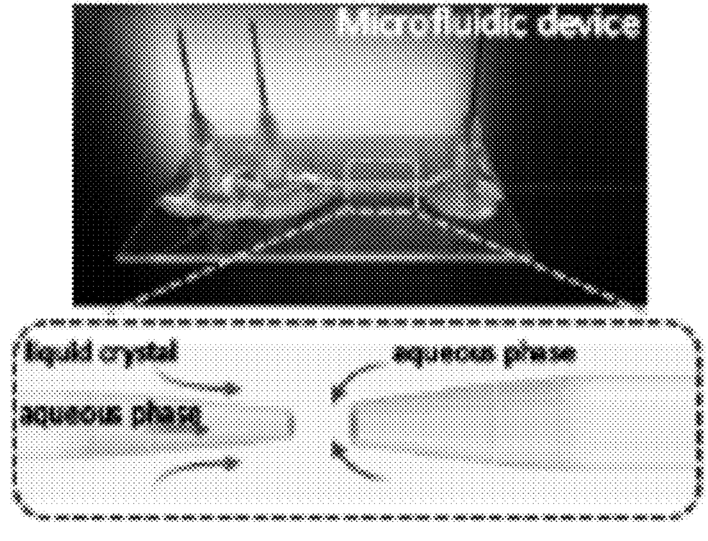
FIG. 40 illustrates a microfluidic device utilized to form spherical shell-shaped BP liquid crystals as described herein.

The core-shell droplets were prepared using a microfluidic setup (FIG. 40). The microfluidic device was designed by a combination of co-flow and flow-focused geometry. Briefly, two round borosilicate capillaries (0.58 mm ID and 1 mm OD, WPI) were tapered by a micropipette puller (P2000, Sutter instrument). Microforge (Narishige, MF-900) was used to adjust the opening of the injection and collection capillaries to 100 μm and 200 μm, respectively. The injection capillary was surface modified using 1 wt % aqueous DMOAP solution (Dimethyloctadecyl [3-(trimethoxysilyl) propyl] ammonium chloride) to render it hydrophobic. The tapered capillaries were aligned inside a square capillary (1.05 mm ID and 1.50 OD, Harvard square tubing) with a separation distance of 300 μm. The square and collection capillaries were modified by 2-[methoxy(polyethyleneoxy) propyl] trimethoxy silane to render their surface hydrophilic. They were then assembled on a precleaned glass slide, and 20-gauge needles were used to inject phases into the capillaries.

The inner phase (core) of the core-shells was injected through the hydrophobic capillary. The liquid crystal formed as the middle, shell phase was injected through the space between the hydrophobic and square capillaries. The outer phase was injected through the gap between the hydrophilic and square capillaries. Three syringe pumps (Elite 11 series, Harvard Apparatus) were used to set the flow rates at 200 μl/hr, 100 μl/hr, and 4000 μl/hr for inner, middle, and outer phases, respectively. The inner and middle phases flowed in the same direction (co-flow), and they were flow-focused by the continuous phase. As such, the innermost aqueous phase was encapsulated by the liquid crystal shell, which became dispersed in the outer phase (continuous phase).

To manipulate the surface alignment of the liquid crystals, different surfactants in water-glycerol mixture solutions (80:20 volume ratio) were examined. For a planar-planar anchoring, 15 wt. % and 10 wt. % polyvinyl alcohol solutions (PVA, 13K-23K, and 87-89% hydrolyzed; Sigma Aldrich) were used for the external phases, respectively. Homeotropic-homeotropic shells contained 10 wt. % and 5 wt. % sodium dodecyl sulfate solutions (SDS, >98% purity;

Sigma Aldrich) for the inner and outer phases, respectively. The hybrid-aligned shells were produced using two different surfactants for the inner and outer phases.

Sodium chloride (Sigma Aldrich) and glycerol (Acros Organic) were added to the aqueous phase to adjust the shell thickness through osmotic thinning process. 2-[methoxy (polyethyleneoxy)propyl] trimethoxy silane (Gelest) and Dimethyloctadecyl[3-(trimethoxysilyl) propyl] ammonium chloride (DMOAP, 72% purity; Sigma Aldrich) was used to render the surface hydrophilic and hydrophobic, respectively.

Figure 41:
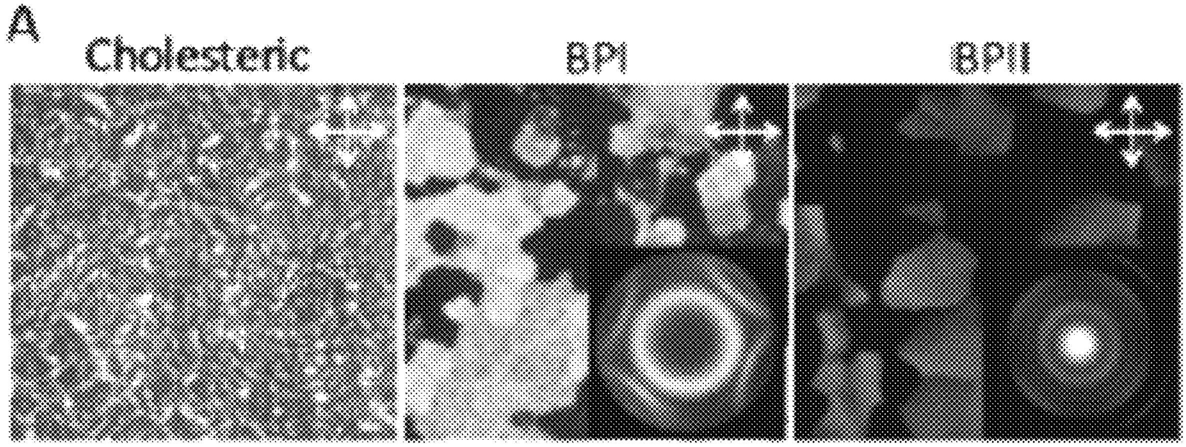
FIG. 41 illustrates polarized optical micrographs of representative BP crystals in the cholesteric, BPI and BPII phases formed in 12 μm thick films and includes corresponding Kossel diagrams (insets).
Figure 42:
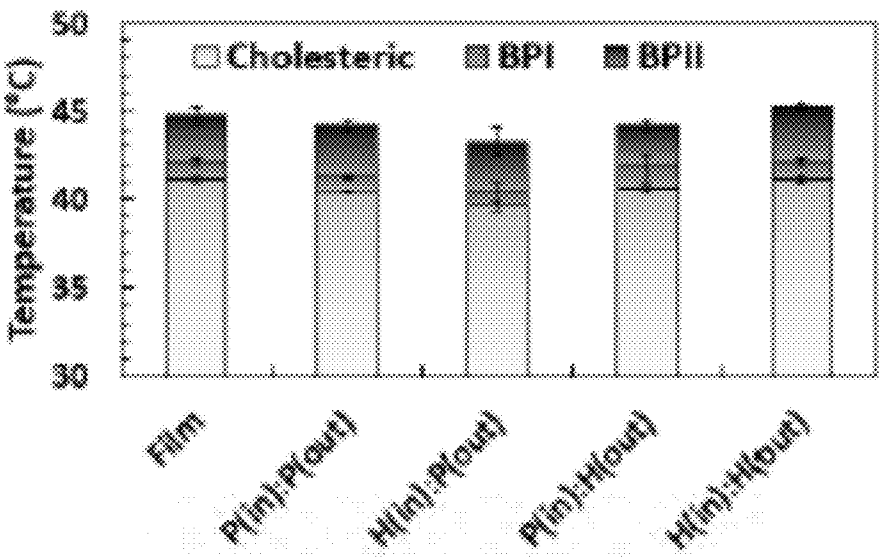
FIG. 42 graphically compares transition temperatures for a representative high chirality liquid crystal in film and curved shell forms with various boundary conditions.

Polarized optical micrographs in the reflection mode revealed the creation of the BPs in the bulk state (FIG. 41), in which the transition from the cholesteric phase to BPI and subsequently to BPII took place at 40.5° C. and 41.5° C., respectively (FIG. 42). The BPI and BPII structures were verified by distinct reflectance peaks at 530 nm and 450 nm, respectively, which can be associated with the Bragg diffraction from [110] and [100] planes of the conoscopy interference patterns (insets in FIG. 41).

Figure 43:
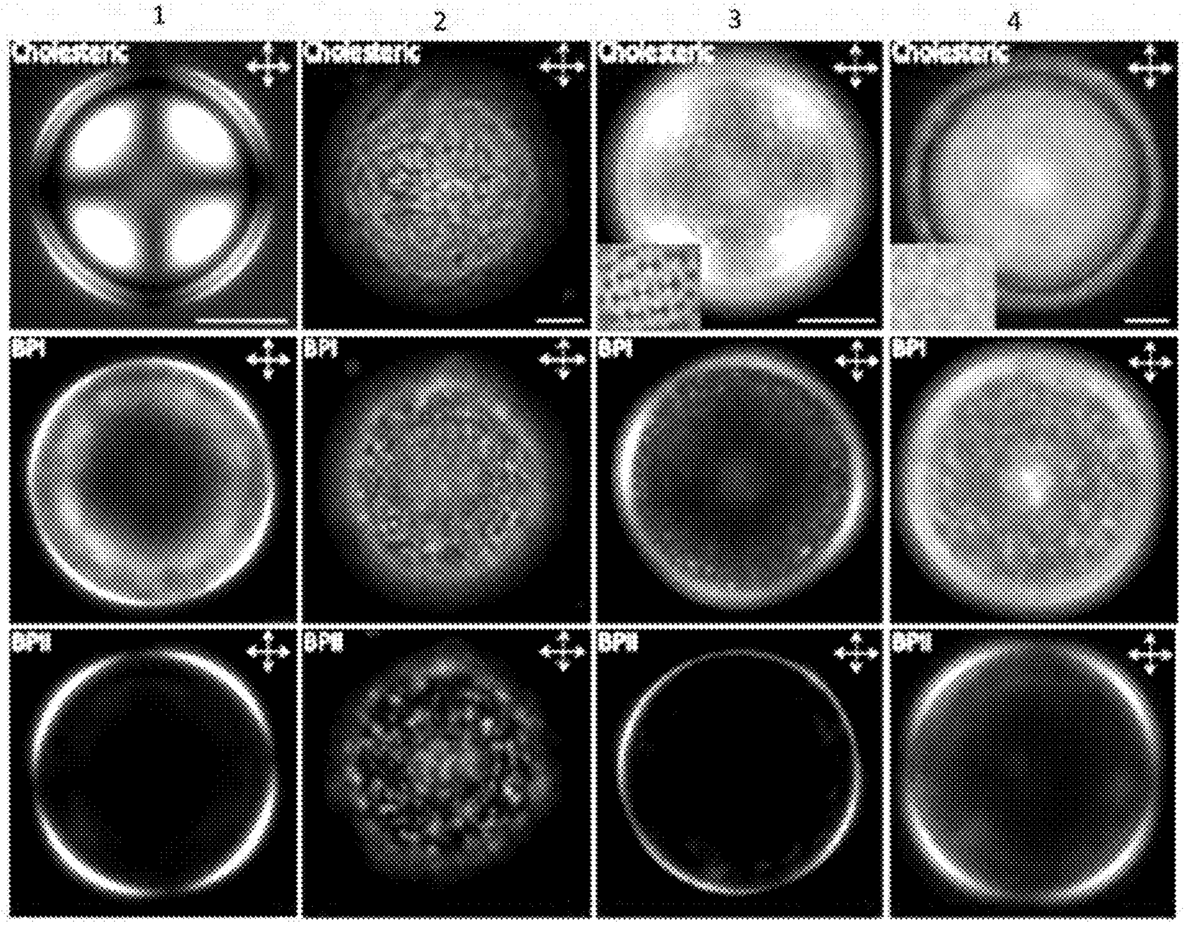
FIG. 43 presents cross-polarized reflection mode images of cholesteric (top row), BPI (middle row), and BPII (bottom row) phases of BP crystals confined in spherical shells with various boundary conditions including uniform planar anchoring (P(in)-P(out)) (Column 1), uniform homeotropic anchoring (H(in)-H(out)) (Column 2), planar anchoring inside and homeotropic anchoring outside (P(in)-H(out)) (Column 3), and homeotropic anchoring inside and planar anchoring outside (H(in)-P(out)) (Column 4) (scale bar=20 μm).

The cores and shells were prepared with both uniform and hybrid aligned surface conditions, i.e., planar at both interfaces (P(in)-P(out)), homeotropic at both interfaces (H(in)-H(out)), planar at one interface and homeotropic at the other, with the shells being prepared with planer the inner and homeotropic at the outer interface (P(in)-H(out)), as well as vice versa (H(in)-P(out)). Resulting crystals are illustrated in FIG. 43 including images at each of the cholesteric, BPI, and BPII phases for crystals formed with each surface condition.

The adjusted Continuum mean field Landau-de Gennes free energy model was utilized to describe and map the disclination patterns of the liquid crystalline systems. Initially implemented were mean-field continuum simulations of chiral liquid crystals confined as flat films in thin channels with uniform homeotropic (homeotropic anchoring on both flat surfaces, H-H), planar-homeotropic (P-H), and uniform planar anchoring conditions (P-P). Following, analysis was carried out on the effect of curvature of the confined chiral liquid crystals in shells, in which all possible combinations of homeotropic and planar anchoring at the inner and outer interfaces were considered (FIG. 37, FIG. 43).

According to the model, free energy of the system is associated with a second-rank order tensor parameter which is defined by $$Q_{ij} = S\left(n_i n_j - \frac{1}{3}\delta_{ij}\right)$$

in which, i, j are local director components, S is scalar order parameter and δ is the identity tensor. In this regard, the total energy function is given by $$F(Q) = \int d^3x[f_L(Q) + f_E(Q)] + \int d^2x f_s(Q)$$

Total free energy is the result of three energy contributions named as short-range free energy $f_L$, long-range free energy $f_E$ and surface anchoring energy $f_S$. These free energy components are defined as follows:

$$f_L = \frac{A}{2}\left(1 - \frac{U}{3}\right)tr(Q^2) - \frac{AU}{3}tr(Q^3) + \frac{AU}{4}tr(Q^2)^2,$$

where, A and U are material specific parameters which are correlated with energy scale and nematic-isotropic transition, respectively. U=5.0, 3.5 and 2.755 were used for Chol, BPI and BPII conditions, respectively. The long-range energy contribution is defined by $$f_E = \frac{1}{2}L\left[\frac{\partial Q_{ij}}{\partial x_k}\frac{\partial Q_{ij}}{\partial x_k} + 2Lq_0\epsilon_{ikl}Q_{ij}\frac{\partial Q_{lj}}{\partial x_k}\right].$$

Here, L is elastic constants and $q_0$ defines the chirality of the system and it is defined by $$q_0 = \frac{2\pi}{P}$$

and $\varepsilon_{ikl}$ is Levi-Civita tensor. The surface energy contribution depends on the anchoring conditions. For planar degenerate it is given by $$f_s = W_P(\tilde{Q}_{ij} - \tilde{Q}_{ij}^{\perp})^2,$$

where, $W_P$ is planar degenerate anchoring strength, $$\tilde{Q}_{ij} = Q_{ij} + \frac{1}{3}S_{eq}\delta_{ij}$$

and $S_{eq}$ defined as $$S_{eq} = \frac{1}{4}\left(1 + 3\sqrt{1 - \frac{8}{3U}}\right).$$

$$Q_{ij}^{\perp}$$

is the projection of $\tilde{Q}_{ij}$ on the surface and is defined as $Q_{ij}=P_{ik}\tilde{Q}_{kl}P_{lj}$ and $P_{ij}=\delta_{ij}-v_iv_j$. For homeotropic anchoring, the surface free energy density is $$f_s = W_H(Q - Q_0)^2,$$

where $W_H$ is the homeotropic anchoring energy and $Q^0$ is the tensor order parameter corresponding to an alignment normal to the surface. For the present study, parameters were defined as follows: p=344 nm, $W_P=4\times10^{-3}$ $Jm^{-2}$ and $W_H=8\times10^{-4}$ $Jm^{-2}$, $A=1.067\times10^5$ $Jm^{-3}$ and L=6 pN. The minimization process was achieved using the finite difference method in a grid box of mesh resolution of a coherence length (ξ=10 nm).

Stable and meta-stable states were analyzed by minimizing the free energy equation by the means of Ginzburg-Landua relaxation which is expressed by $$\frac{\partial Q}{\partial t} = -\frac{1}{\gamma}\left[\sqcap\left(\frac{\partial F}{\partial Q}\right)\right].$$

Initial configuration for BPI and BPII were obtained as follows:

For BPI:

$$Q_{xx} = a\left(-\sin\left(\frac{ky}{\sqrt{2}}\right)\cos\left(\frac{kx}{\sqrt{2}}\right) - \sin\left(\frac{kx}{\sqrt{2}}\right)\cos\left(\frac{ky}{\sqrt{2}}\right) + 2\sin\left(\frac{kz}{\sqrt{2}}\right)\cos\left(\frac{ky}{\sqrt{2}}\right)\right),$$

$$Q_{xy} = a\left(-\sin\left(\frac{kx}{\sqrt{2}}\right)\cos\left(\frac{kz}{\sqrt{2}}\right) - \sin\left(\frac{ky}{\sqrt{2}}\right)\cos\left(\frac{kz}{\sqrt{2}}\right) + 2\sin\left(\frac{kx}{\sqrt{2}}\right)\cos\left(\frac{ky}{\sqrt{2}}\right)\right).$$

For BPII:

$$Q_{xx} = a(\cos(kz) - \cos(ky)),$$

$$Q_{xy} = a\sin(kz).$$

In all cases the components yy, zz, xz, and yz were obtained by the corresponding cyclic permutation.

The resulting disclination line structures for the crystals confined in channels are shown in FIG. 1 (BPI phase) and FIG. 2 (BPII phase). The line structures of FIG. 1 were formed by confinement of a liquid crystal with chiral pitch (p) of 344 nm in thin channels at the BPI temperature regimen. In the figures Z represents the channel thickness in coherence length units (ξ=10 nm) and H-H, H-P and P-P refer to the anchoring conditions at the top and bottom interfaces, respectively. As indicated, H-H conditions induce higher distortion of the BPI disclination lines. For Z≥35 (350 nm) the BPI shows a (110) lattice orientation. BPI disclination lines also approach each other near the homeotropic interfaces, thereby shrinking the unit cells.

FIG. 2 illustrates the BPII phase crystals with chiral pitch, p=344 nm, in thin channels at the BPII-temperature regimen. Z, H, and P are as defined above. The top panel shows the xy plane; middle and bottom panels show the lateral views in the xz and yz planes, respectively. When comparing FIG. 1 and FIG. 2, it can be seen that similar (skyrmion like) structures are present for channel thickness Z<35 (350 nm). The BPII is thus stabilized for Z≥35 (350 nm).

Cross-polarized reflection mode images of the spherical shell BP crystals are shown in FIG. 43. Column 1 of FIG. 43 illustrates a spherical shell-shaped crystal that includes planar surface anchoring on both the inner and outer surfaces of the shell. The images illustrate the liquid crystal in the cholesteric phase (top), BPI phase (middle), and BPII phase (bottom). Column 2 of FIG. 43 illustrates a spherical shell-shaped liquid crystal in the cholesteric, BPI, and BPII phases formed with homeotropic surface anchoring at both the inner and outer interfaces of the shell. The homeotropic anchoring at both inner and outer interfaces induces further frustration leading to the formation of hexagonal patterns on the shell surface, where normal alignments of the liquid crystal molecules compete with the preferred in-plane orientation of the bulk. Column 3 of FIG. 43 illustrates a spherical shell-shaped liquid crystal in the cholesteric, BPI, and BPII phases that was formed with planar anchoring on the inner surface of the shell and homeotropic anchoring on the outer surface, and Column 4 of FIG. 43 illustrates a spherical shell-shaped liquid crystal in the cholesteric, BPI, and BPII phases that was formed with homeotropic anchoring on the inner surface of the shell and planar anchoring on the outer surface.

The disclination patterns of the spherical shell crystals are shown in FIG. 37, FIG. 38, and FIG. 39. As indicated, in thin shells, the frustrations induced by curvature and homeotropic surface alignment disrupt BPI lattice periodicity, forcing it to shrink and form junctions of disclination lines near the shell/core interface.

Regardless of the shell size, at temperatures where BPs are observed in bulk (i.e. U=2.755 for BPII and U=3.5 for BPI), the computational results also showed a lower total free energy density when the simulations started from an initial BPII configuration. Although a higher structural stability for BPII in thin shells was observed, skyrmion lattices developed when h/p≈1.5, meaning that below this thickness BP morphologies were no longer stable. As a result, the points shown in FIG. 38 correspond to skyrmion like structures that are formed at the BPII and BPI thermal conditions (see also FIG. 39).

To understand the arrangement of the disclination lines in BPs within thin shells, computational simulations were further performed for shells with thickness to pitch length ratio h/p of 1.5, 1, and 0.5. Results are shown in FIG. 39. By reducing the shell thickness to half a pitch length, the hexagonal network of disclination lines formed throughout the BP shells, reminiscent of half-skyrmions textures. The bond orientational order parameter (BOP) was computed for shells with R=820 nm, 1100 nm, and 1370 nm to characterize the possible structures. To do so, the average of $$|\Psi_n|^2 = \Psi_n \Psi_n^*$$

was calculated, where $$\Psi_n(r_i) = \frac{1}{N_i}\sum\nolimits_{j=0}^{N_i} e^{ni\theta_{ij}},$$

$\theta_{ij}$ is the angle between an arbitrary fixed direction and the vector connecting the center of the skyrmion particle i and j, and $N_i$ is the number of nearest neighbors. The BOP is a measure of the present arrangements of the obtained lattices. For example, $|\Psi_6|=1$ indicates a perfect hexagonal lattice. The results showed that, regardless of the shell radius, $|\Psi_6|$ is the dominant value followed by $|\Psi_5|$, which indicates that skyrmions are mostly distributed in hexagonal and pentagonal arrangements on the shell surface. These symmetries can also be identified by the polygons formed by the contours of the $\lambda^{-1/2}$ disclination line on the surface of the shells in the BPII phase (FIG. 39).

Table 1, below, presents BOP for different shell sizes and h/p=0.5 and U=2.755. The obtained values indicate that the skyrmion lattices were mostly formed by hexagonal and pentagonal arrangements. BOPs for n<5 and n>8 were not observed. Note that for a shell thickness h/p=0.5 BOP with n=8 only appears in large droplets.

TABLE 1

| | BOP | | | |
|---|---|---|---|---|
| R | n = 5 | n = 6 | n = 7 | n = 8 |
| 820 nm | 0.184 | 0.755 | 0.061 | 0 |
| 1100 nm | 0.185 | 0.697 | 0.118 | 0 |
| 1370 nm | 0.166 | 0.725 | 0.098 | 0.011 |

Example 2

Disclination line maps of BPII [100], BPII [110], and BPII [111] disclination structures were scaled up and the resulting patterns were used as a guide for a 3D printing protocol.

Figure 44:
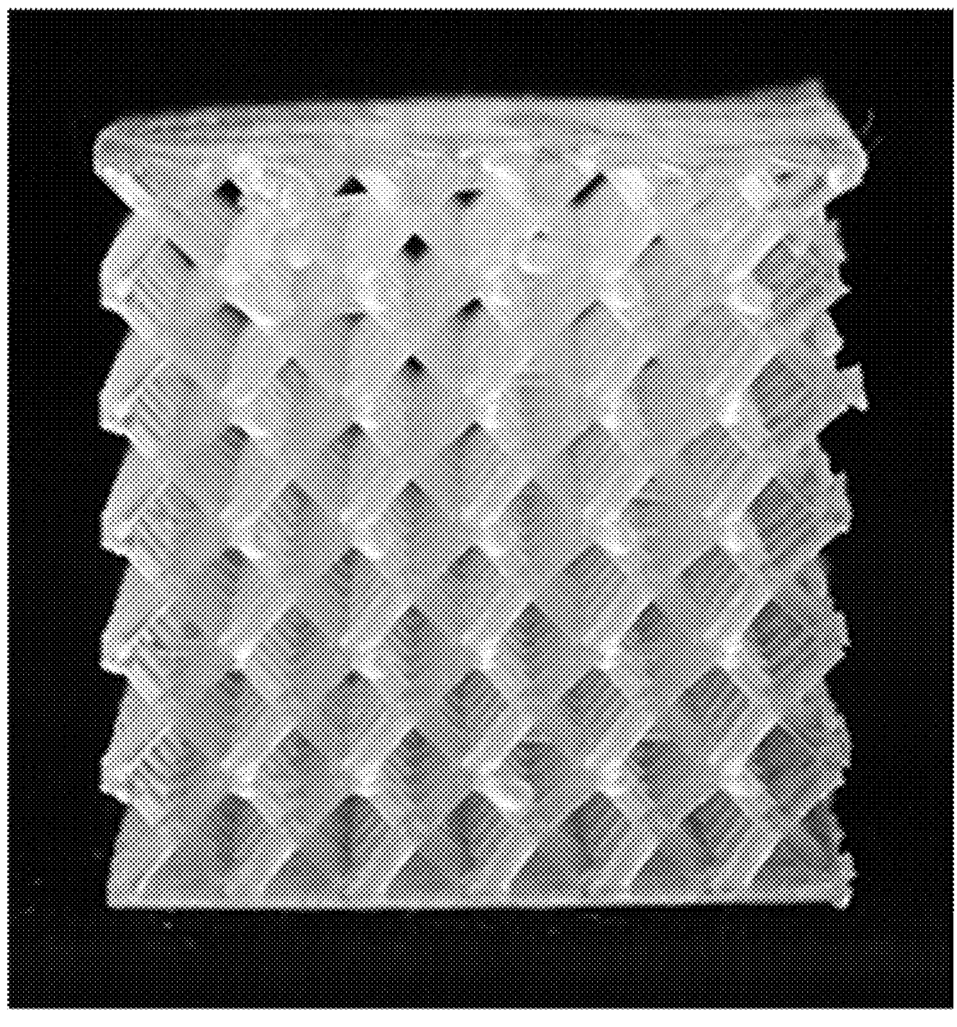
FIG. 44 illustrates a macroscopic 3D printed structure based on a BPII [100] disclination pattern.
Figure 45:
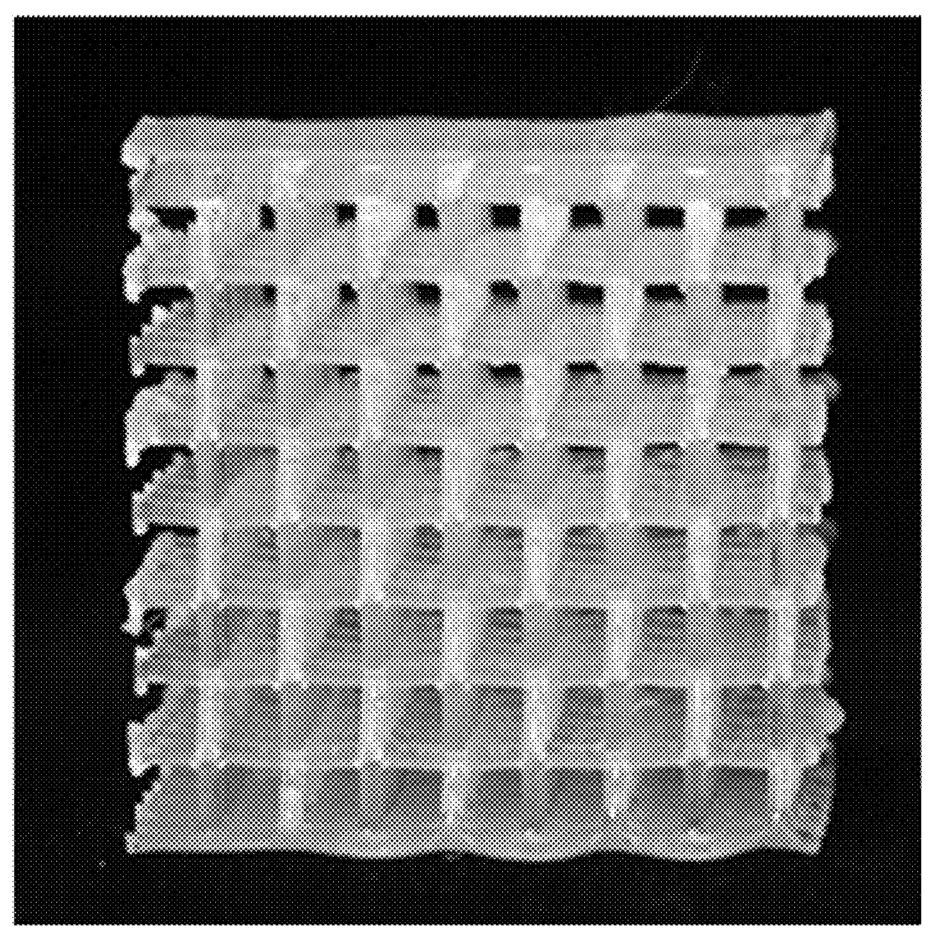
FIG. 45 illustrates a macroscopic 3D printed structure based on a BPII [110] disinclination pattern.
Figure 46:
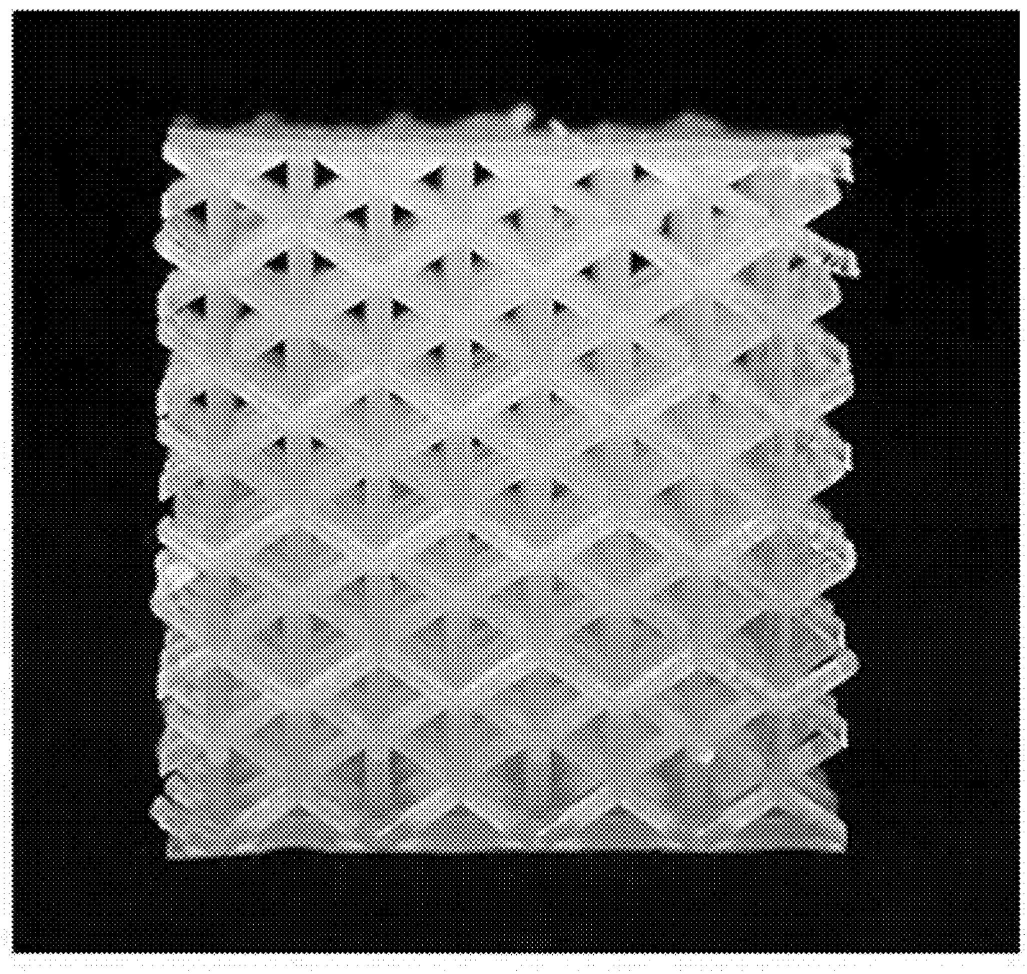
FIG. 46 illustrates a macroscopic 3D printed structure based on a BPII [111] disinclination pattern.
Figure 47:
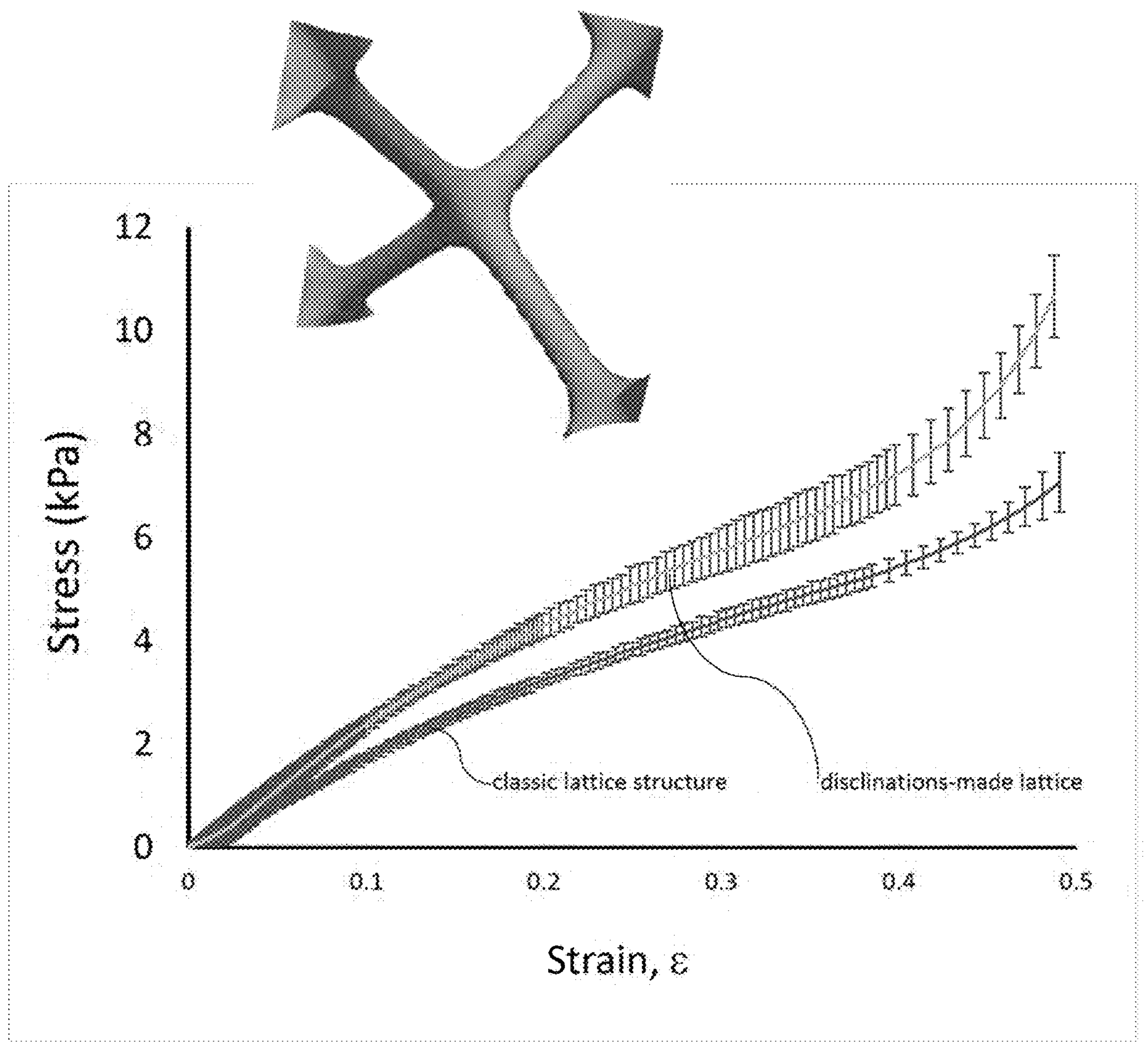
FIG. 47 presents mechanical characteristics of the BPII [100] based structure compared to a standard cubic structure.
Figure 48:
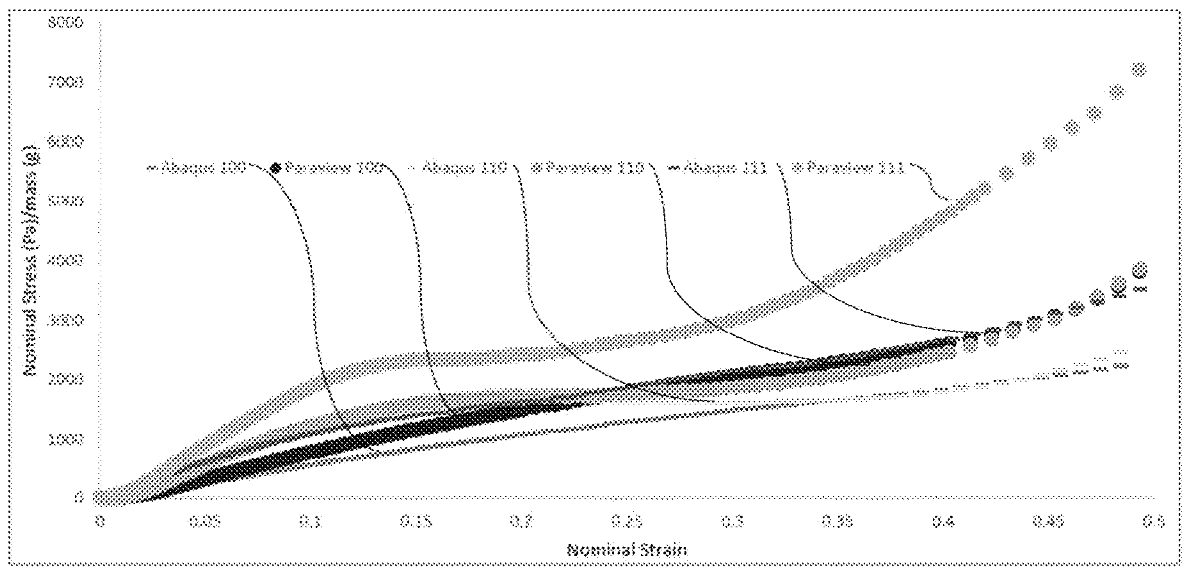
FIG. 48 presents mechanical characteristics of all three of the BPII facets compared with standard cubic structures.

A Formlabs™ SLA 3D printer was utilized to print the structures using a polyurethane photopolymerizable resin (Flexible 80A Resin available from Formlabs™) that exhibits a Shore A durometer hardness of 80 upon cure. The thickness of the disclination lines were varied and could be tuned to tailor the mechanical properties of the printed structures. The resulting BPII [100]-based structure is shown in FIG. 44, the resulting BPII [110]-based structure is shown in FIG. 45, and the resulting BPII [111]-based structure is shown in FIG. 46. FIG. 47 present mechanical characteristics of the BPII [100]-based structure compared to a standard cubic structure designed using Abaqus. Structures made from BPII [100] outperforms the standard cubic structures. FIG. 48 present mechanical characteristics of all three BPII facets compared with standard cubic structures. All three BPII structures outperform standard structures designed using Abaqus.

As indicated in the figures, the printed 3D defect networks of BPII cuboidal symmetries exhibited directional exotic responses under mechanical deformation. The spatial pattern of the BPII disclination pattern was designed with different plane orientations, and the resulting materials demonstrate the NPR or ZPR responses in the specific direction associated with its crystalline feature.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a structure, comprising:

mapping a network of disclination lines of a blue phase liquid crystal;

scaling up the mapped network; and manufacturing a structure, the structure comprising the scaled-up mapped network, the structure exhibiting auxetic, zero Poisson's ratio, or little transverse deformation under an axial strain.

2. The method of claim 1, further comprising forming the blue phase crystal.

3. The method of claim 2, the crystal formation comprising surface anchoring the blue phase crystal.

4. The method of claim 3, the surface anchoring comprising planar surface anchoring, homeotropic surface anchoring, or a combination thereof.

5. The method of claim 2, wherein the blue phase crystal is formed in the shape of a shell, the shell partially or completely surrounding an interior volume.

6. The method of claim 2, wherein the crystal is formed with a curved surface.

7. The method of claim 2, wherein the crystal is formed with a predetermined ratio of thickness to chiral pitch.

8. The method of claim 7, wherein the ratio is about 0.5 or greater.

9. The method of claim 1, wherein the network of disclination lines is mapped by applying a continuum Landau-De Gennes theoretical model.

10. The method of claim 1, wherein the mapped network is scaled up by a factor of about 10 or greater.

11. The method of claim 1, wherein the structure is manufactured according to an additive manufacturing process.

12. The method of claim 11, wherein the additive manufacturing process comprises a stereolithography process or a deposition process.

13. The method of claim 1, wherein the structure exhibits auxetic or zero Poisson's ratio deformation under an axial strain.

* * * * *